United States Patent
Choi et al.

(10) Patent No.: US 11,216,129 B2
(45) Date of Patent: Jan. 4, 2022

(54) TOUCH SENSOR AND SENSOR ARRAY

(71) Applicant: Samsung Electronics Co., Ltd., Suwon-si (KR)

(72) Inventors: Yoon Kyung Choi, Seoul (KR); Ki Up Kim, Bucheon-si (KR); Jin Bong Kim, Yongin-si (KR); Sung Yong Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 64 days.

(21) Appl. No.: 16/738,492

(22) Filed: Jan. 9, 2020

(65) Prior Publication Data

US 2020/0326815 A1 Oct. 15, 2020

(30) Foreign Application Priority Data

Apr. 15, 2019 (KR) .................. 10-2019-0043574
Nov. 1, 2019 (KR) .................. 10-2019-0138718

(51) Int. Cl.
*G06F 3/044* (2006.01)

(52) U.S. Cl.
CPC .......... *G06F 3/0443* (2019.05); *G06F 3/0446* (2019.05); *G06F 2203/04112* (2013.01)

(58) Field of Classification Search
CPC ................ G06F 3/0443; G06F 3/0446; G06F 2203/04112
See application file for complete search history.

(56) References Cited

U.S. PATENT DOCUMENTS

| | | | |
|---|---|---|---|
| 9,235,297 B2 | 1/2016 | Liu | |
| 9,891,774 B2 | 2/2018 | Khazeni et al. | |
| 2013/0215053 A1* | 8/2013 | Lin | G06F 3/041 345/173 |
| 2015/0268783 A1 | 9/2015 | Yoon et al. | |
| 2015/0378479 A1* | 12/2015 | Hayashi | G06F 3/0412 345/174 |

FOREIGN PATENT DOCUMENTS

KR 10-2016-0033799 A 3/2016

* cited by examiner

*Primary Examiner* — Kent W Chang
*Assistant Examiner* — Chayce R Bibbee
(74) *Attorney, Agent, or Firm* — Harness, Dickey & Pierce, P.L.C.

(57) ABSTRACT

A touch sensor including a sensor array including a first touch node and a second touch node adjacent to each other in at least one of a first direction or a second direction, the second direction perpendicular to the first direction, the first touch node and the second touch node electrically separated from each other, each of the first touch node and the second touch node including a driving electrode and a sensing electrode, and a controller configured to output a first driving signal having a first phase to the driving electrode of the first touch node and output a second driving signal having a second phase opposite to the first phase of the first driving signal to the driving electrode of the second touch node may be provided. The controller may be further configured to output the first driving signal and the second driving signal simultaneously.

16 Claims, 32 Drawing Sheets

TOUCH SENSOR AND SENSOR ARRAY

CROSS-REFERENCE TO RELATED APPLICATION

This application claims benefit of priority to Korean Patent Application No. 10-2019-0043574 filed on Apr. 15, 2019 and No. 10-2019-0138718 filed on Nov. 1, 2019, in the Korean Intellectual Property Office, the disclosure of each of which is incorporated herein by reference in its entirety.

BACKGROUND

1. Field

The present disclosure relates to touch sensors and/or sensor arrays.

2. Description of Related Art

A touch sensor is a device for determining coordinates of a touch input, a gesture, and the like, by sensing the touch input. The touch sensor may sense (or detect) the touch input using a change in electrical characteristics such as resistance, capacitance, and the like. A touch sensor sensing a touch input using a change in capacitance may be classified into a first sensing type using a change in self-capacitance or a second sensing type using a change in mutual capacitance.

SUMMARY

Some example embodiments of the present disclosure may provide touch sensors and/or sensor arrays capable of reducing or minimizing performance degradations that may occur in an operating environment in which a grounding state is not stable.

According to an example embodiment of the present disclosure, a touch sensor including (1) a sensor array includes a first touch node and a second touch node adjacent to each other in at least one of a first direction or a second direction, the second direction perpendicular to the first direction, the first touch node and the second touch node electrically separated from each other, each of the first touch node and the second touch node including a driving electrode and a sensing electrode, and (2) a controller configured to output a first driving signal having a first phase to the driving electrode of the first touch node and output a second driving signal having a second phase opposite to the first phase of the first driving signal to the driving electrode of the second touch node may be provided. The controller may be further configured to output the first driving signal and the second driving signal simultaneously.

According to an example embodiment of the present disclosure, a sensor array includes (1) a first touch node including a first driving electrode and a first sensing electrode in at least one of a first direction or a second direction, the second direction being perpendicular to the first direction, the first driving electrode configured to receive a first driving signal having a first phase during a first time period, the first sensing electrode being adjacent to the first driving electrode, and (2) a second touch node being adjacent to the first touch node in at least one of the first direction or the second direction, the second touch node including a second driving electrode and a second sensing electrode, the second driving electrode configured to receive a second driving signal having a second phase opposite to the first phase of the first driving signal during the first time period, the second sensing electrode electrically separated from the first sensing electrode.

According to an example embodiment of the present disclosure, a sensor array includes (1) a plurality of first driving lines each including a plurality of first driving electrodes physically separate from each other while electrically connected to each other, (2) a plurality of first sensing lines each including a plurality of first sensing electrodes, the plurality of first sensing lines physically separate from each other while adjacent to at least one of the plurality of first driving electrodes, (2) a plurality of second driving lines electrically separated from the plurality of first driving lines, each of the plurality of second driving lines including a plurality of second driving electrodes physically separate from each other while electrically connected to each other, and (4) a plurality of second sensing lines each including a plurality of second sensing electrodes, the plurality of second sensing electrodes physically separate from each other while adjacent to at least one of the plurality of second driving electrodes. First waveforms of first sensing signals of the plurality of first sensing electrodes may be different from second waveforms of second sensing signals of the plurality of second sensing electrodes.

BRIEF DESCRIPTION OF DRAWINGS

The above and other aspects, features and other advantages of the present disclosure will be more clearly understood from the following detailed description taken in conjunction with the accompanying drawings, in which:

FIGS. 7 and 8 are views illustrating operations of the touch sensor according to an example embodiment in the present disclosure;

DETAILED DESCRIPTION

Hereinafter, some example embodiments in the present disclosure will be described in detail with reference to the accompanying drawings.

Figure 1:
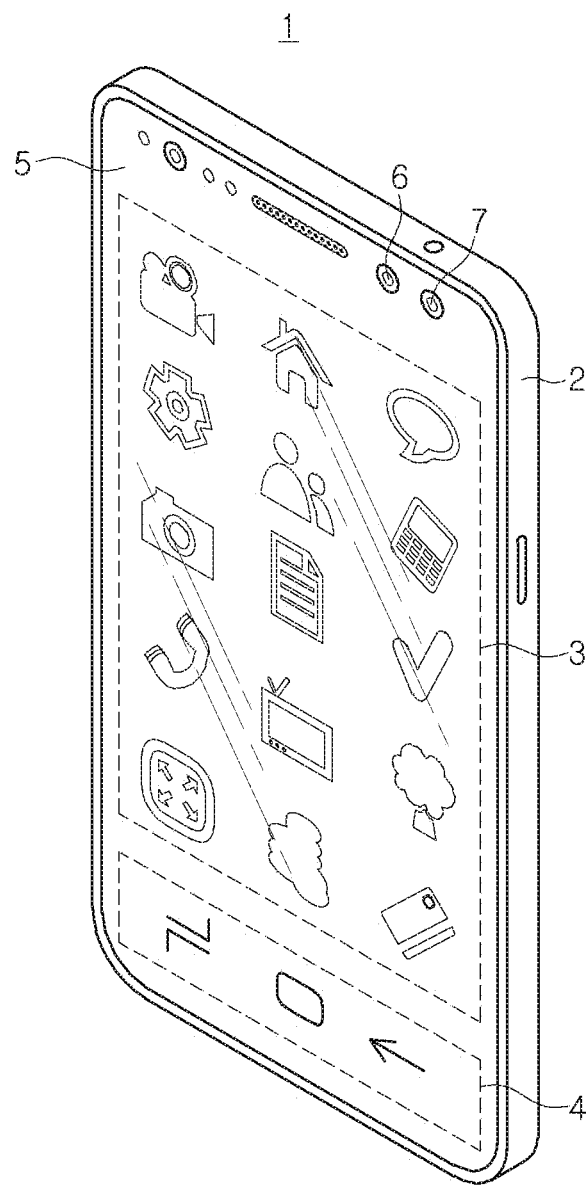
FIG. 1 is a view illustrating an exterior of an electronic device including a touch sensor according to an example embodiment in the present disclosure.

FIG. 1 is a view illustrating an exterior of an electronic device including a touch sensor according to an example embodiment in the present disclosure.

Referring to FIG. 1, an electronic device 1 including a touch sensor according to an example embodiment in the present disclosure may be a mobile device such as a smartphone, a laptop computer, a tablet PC and so on. However, the touch sensor according to an example embodiment in the present disclosure may be widely applied to home appliances such as televisions, refrigerators, monitors, and the like, and vehicles, in addition to a mobile device.

The electronic device 1 may include a housing 2, a display 5, a camera 6, and the like. In an example embodiment, the display 5 may cover most of the entire front surface of the housing 2, and may be divided into a first region 3 and a second region 4 according to operating modes of the electronic device 1, or applications being executed, and the like, so as to be operated. The camera 6 may be combined with a light source 7 to provide a face recognition function or the like.

Figure 2:
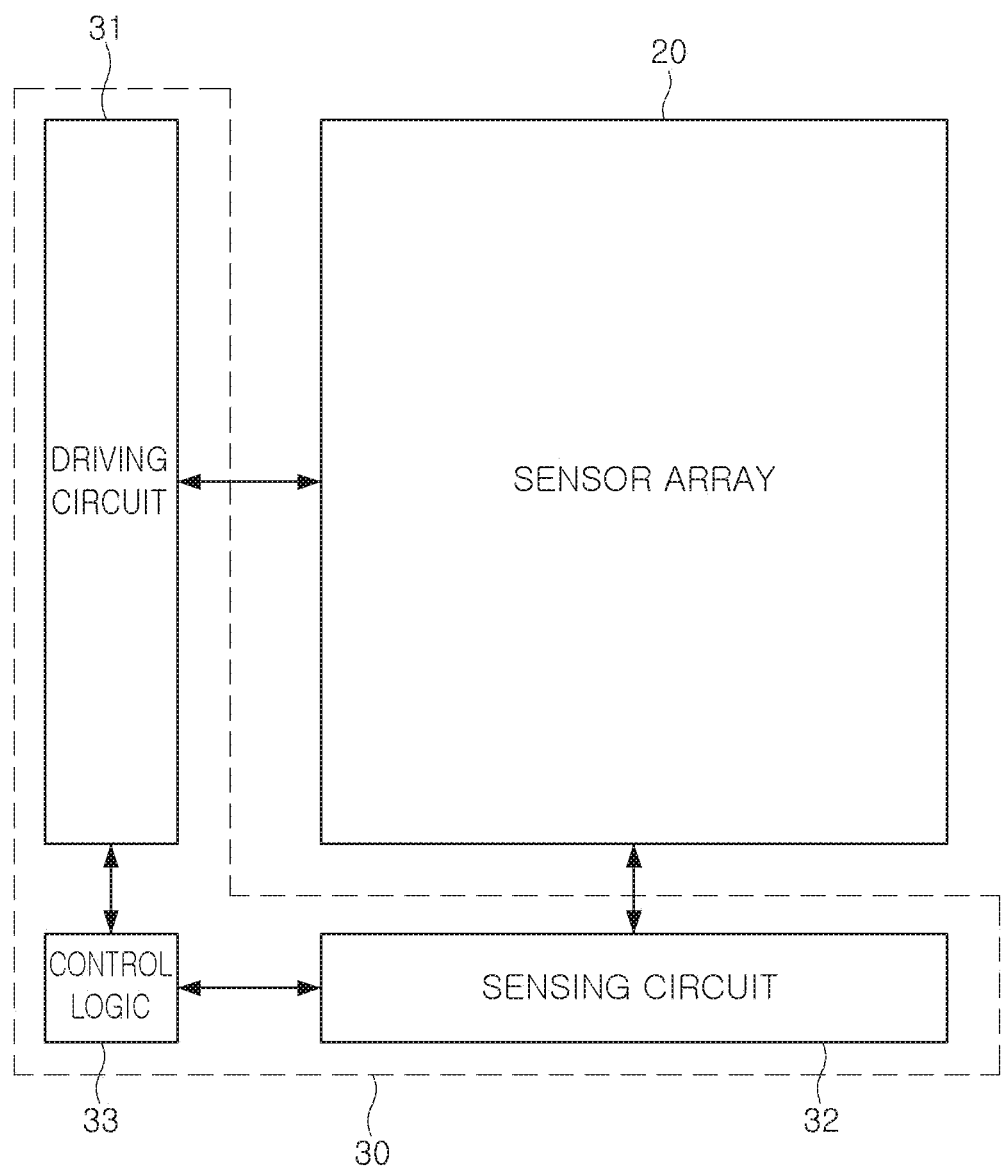
FIG. 2 is a simplified view of a touch sensor according to an example embodiment in the present disclosure.
Figure 3A:
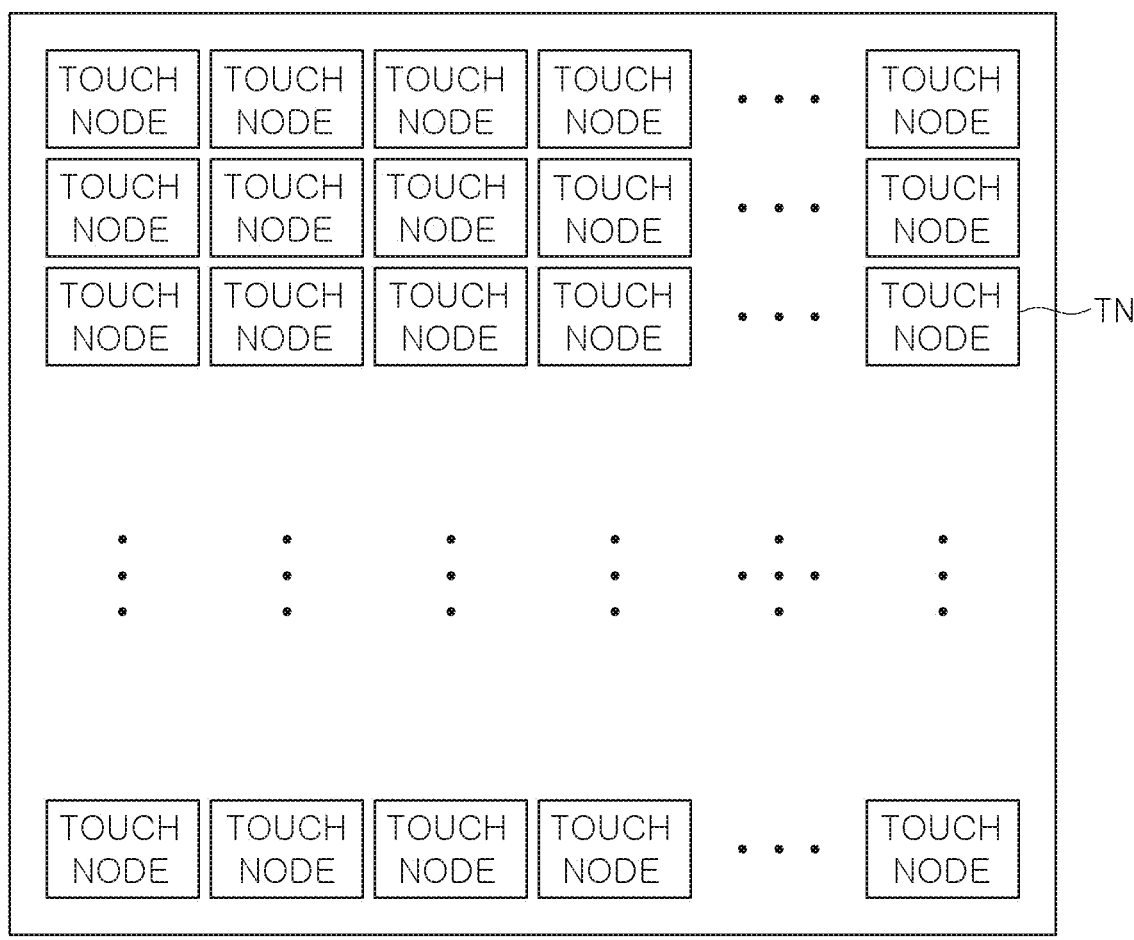
FIGS. 3A through 3C are simplified views of a sensor array of a touch sensor according to an example embodiment in the present disclosure.
Figure 3B:
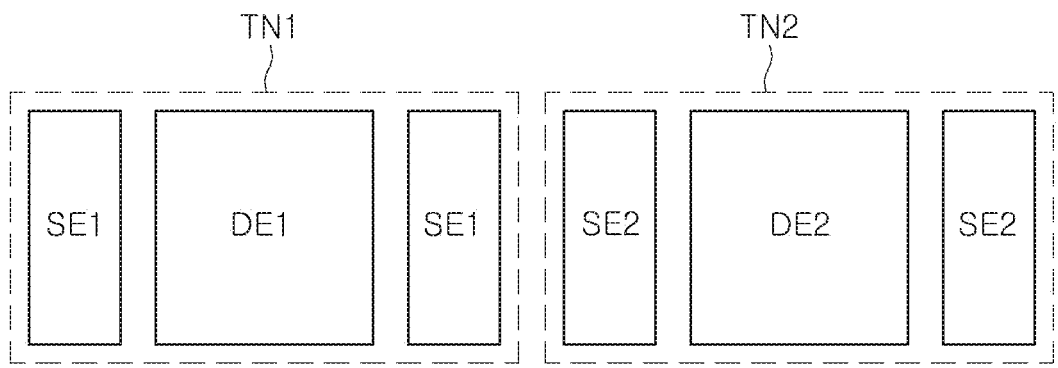
Figure 3C:
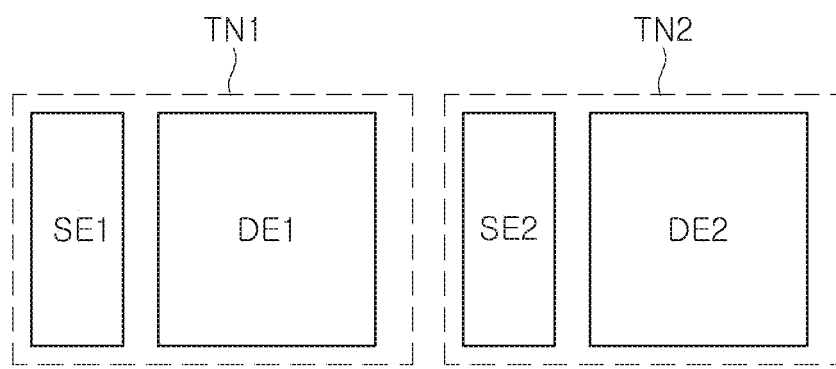

The touch sensor according to an example embodiment in the present disclosure may be a touch screen and include a sensor array in which an electric signal is generated in response to a touch input, a controller (not shown) connected to the sensor array to determine coordinates of the touch input, a gesture, and the like. The touch sensor may be provided on a front surface of the display 5 or may be integrated with the display 5. FIG. 2 is a simplified view of a touch sensor according to an example embodiment in the present disclosure. FIGS. 3A through 3C are a simplified view of a sensor array of a touch sensor according to an example embodiment in the present disclosure.

Referring to FIG. 2, a touch sensor 10 according to an example embodiment in the present disclosure may include a sensor array 20 and a controller 30. The controller 30 may include a driving circuit 31, a sensing circuit 32, and a control logic 33. The driving circuit 31 may input a driving signal to a driving electrode included in the sensor array 20. The driving signal may be a clock signal having a desired (or alternatively, predetermined) frequency, a duty ratio, and the like.

The controller 30 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The sensing circuit 32 may detect a change in capacitance generated in the sensor array 20 in response to a touch input. For example, mutual capacitance may be generated between the driving electrode receiving the driving signal from the driving circuit 31 and a sensing electrode, and may be changed by the touch input. The sensing circuit 32 may detect the change in mutual capacitance and generate a sensing voltage. In an example embodiment, the sensing circuit 32 may compare the sensing voltage with a reference voltage. The control logic 33 may determine at least one of whether the touch input is generated, the coordinates of the touch input, or a gesture, on the basis of a result of comparing the sensing voltage with the reference voltage.

Referring to FIGS. 3A through 3C, the sensor array 20 may include a plurality of touch nodes TN. First, referring to FIG. 3A, the touch nodes TN may be arranged in a first direction and a second direction, perpendicular to the first direction. In the example embodiment illustrated in FIG. 3, the first direction and the second direction may be defined as a transverse direction and a longitudinal direction, respectively.

Each of the plurality of touch nodes TN may include at least one driving electrode and at least one sensing electrode. For example, the driving electrode of each of the plurality of touch nodes TN may be electrically connected to the driving electrode of at least one of the other touch nodes TN. In addition, the sensing electrode of each of the plurality of touch nodes TN may be electrically connected to the sensing electrode of at least one of the other touch nodes TN. A connection relationship between the driving electrodes and the sensing electrodes included in the touch nodes TN may be determined variously by a layout of the driving electrodes and the sensing electrodes in the touch nodes TN, a routing method of the driving electrodes and the sensing electrodes, or the like.

FIGS. 3B and 3C may be diagrams illustrating some of the touch nodes TN. First, referring to FIG. 3B, a first touch node TN1 may include a first driving electrode DE1 and a first sensing electrode SE1. The first sensing electrode SE1 may include, for example, two sub-electrodes and arranged on both sides of the first driving electrode DE1, and the two sub-electrodes may be electrically connected to each other by a routing wire or the like. A second touch node TN2 may include a second driving electrode DE2 and a second sensing electrode SE2.

Referring to FIG. 3C, the first touch node TN1 may include a first driving electrode DE1 and a first sensing electrode SE1, and the second touch node TN2 may include a second driving electrode DE2 and a second sensing electrode SE2. In the example embodiment illustrated in FIG. 3C, each of the sensing electrodes SE1 and SE2 may not be divided into two or more sub-electrodes.

In an example embodiment in the present disclosure, as illustrated in FIGS. 3B and 3C, a first driving signal and a second driving signal having mutually opposite phases may be input to the first touch node TN1 and the second touch node TN2, respectively. For example, the first driving signal may be input to the first driving electrode DE1, and the second driving signal having a phase opposite to that of the first driving signal may be input to the second driving electrode DE2. Therefore, an influence of a change in self-capacitance generated at the first touch node TN1 and a change in self-capacitance generated at the second touch node TN2 by the touch input on a change in mutual capacitance generated by the touch input may be reduced or minimized.

Meanwhile, in the example embodiments described with reference to FIGS. 3A through 3C, the electrodes included in the touch nodes TN may have a mesh shape having opening regions. For example, the touch nodes TN having a mesh shape may be formed by arranging metals having conductivity in a lattice form. The ratio of the area occupied by the opening regions in each of the touch nodes TN may be variously modified according to some example embodiments.

The metal for forming the touch nodes TN may include at least one of materials having relatively high conductivity such as silver or copper. The touch nodes TN having a mesh shape may be realized by weaving metallic wires having a thin thickness and a small width that are not recognizable by human eyes, and at least some of the touch nodes TN adjacent to each other in the first direction and the second direction may be connected in various manners using a routing wire. The routing wire may be formed of metallic wires such as the touch nodes TN. According to example embodiments, the routing wire may be disposed on the same layer on which the touch nodes TN are disposed or on a layer different from a layer on which the touch nodes TN are disposed. Also, according to example embodiments, at least some of the touch nodes TN may be disposed on different layers, or the driving electrodes and the sensing electrodes included in each of the touch nodes TN may be disposed on different layers.

FIGS. 4A to 6 are views illustrating an operation of the touch sensor according to an example embodiment in the present disclosure.

Figure 4A:
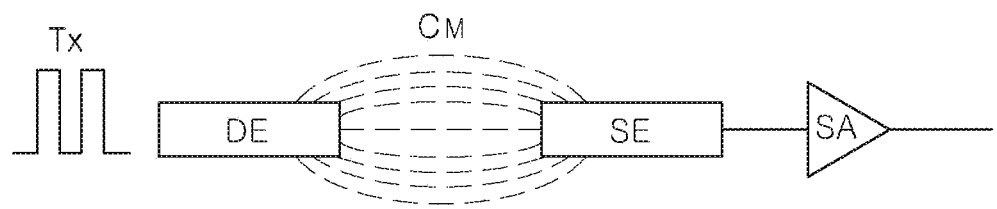
FIGS. 4A through 6 are views illustrating operations of a touch sensor according to an example embodiment in the present disclosure.

First, operations of a touch sensor that detects a change in mutual capacitance and a touch sensor that detects a change in self-capacitance will be described with reference to FIGS. 4A to 4C. First, referring to FIG. 4A, a driving signal Tx may be input to a driving electrode DE of the touch sensor. The driving signal Tx may be a clock signal having a desired (or alternatively, predetermined) frequency, a duty ratio, and the like. The driving signal Tx may cause mutual capacitance $C_M$ to be generated between the driving electrode DE and the sensing electrode SE.

Figure 4B:
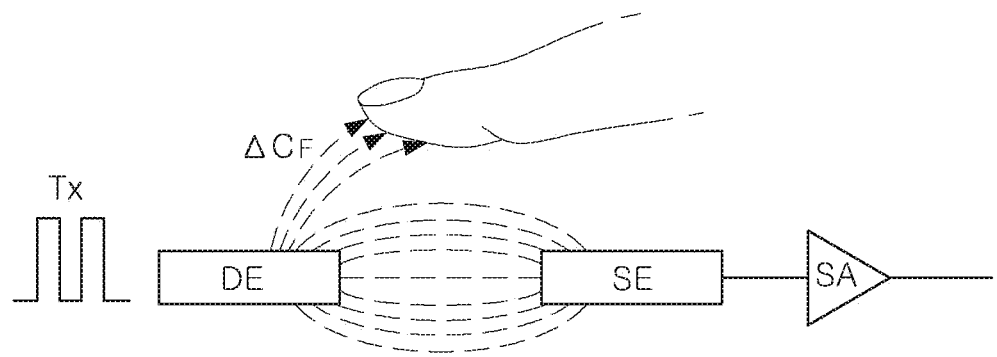

Referring to FIG. 4B, a change $\Delta C_F$ may occur in mutual capacitance between the driving electrode DE and the sensing electrode SE by touch input. For example, the change $\Delta C_F$ in mutual capacitance may be determined by an area of a touch region in which the touch input is applied, a distance between an object which applies the touch input and the driving electrode DE and the sensing electrode SE, and the like. The mutual capacitance $C_M$ between the driving electrode DE and the sensing electrode SE may be decreased due to the change $\Delta C_F$ in mutual capacitance. The touch sensor may determine the touch input by sensing the decrease in mutual capacitance $C_M$ due to the change $\Delta C_F$ in mutual capacitance using a sampling circuit SA.

Figure 4C:
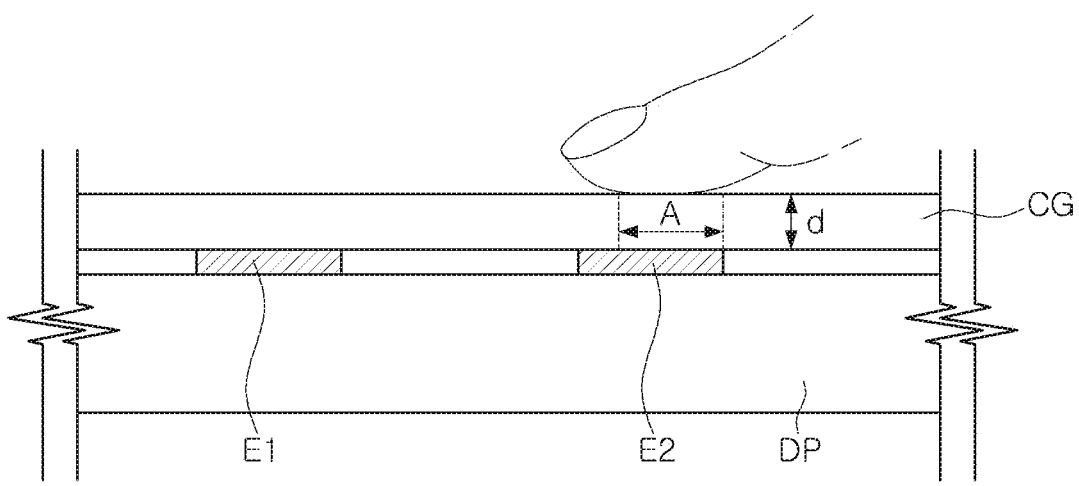

FIG. 4C is a view illustrating an operation of the touch sensor detecting a change in self-capacitance. In the example embodiment illustrated in FIG. 4C, electrodes E1 and E2 may be disposed on the top of a display device DP. Referring to FIG. 4C, in the case of detecting a change in self-capacitance, the electrodes E1 and E2 included in the touch sensor may not be divided into a driving electrode and a sensing electrode. A magnitude of the change in self-capacitance caused by the touch input may be determined by an area A in which a touch input is applied, a permittivity ε and a thickness d of a cover window CG covering the electrodes E1 and E2, and the like, as expressed by Equation 1 below. That is, the change in self-capacitance may increase as the thickness d of the cover window CG decreases.

$$C = \frac{\varepsilon A}{d} \qquad \text{[Equation 1]}$$

However, the change in self-capacitance may also occur in the touch sensor that detects a touch input using a change $\Delta C_F$ in mutual capacitance. For example, in an example embodiment illustrated in FIG. 4B, a change in self-capacitance may occur in at least one of the driving electrode DE and the sensing electrode SE by the touch input. Unlike the change $\Delta C_F$ in mutual capacitance which appears as a decrease in mutual capacitance $C_M$ between the driving electrode DE and the sensing electrode SE, capacitance may be added to at least one of the driving electrode DE and the sensing electrode SE due to the change in self-capacitance. Therefore, if a significant change occurs in the touch sensor that detects the change $\Delta C_F$ in mutual capacitance, performance of the touch sensor may deteriorate.

Figure 5:
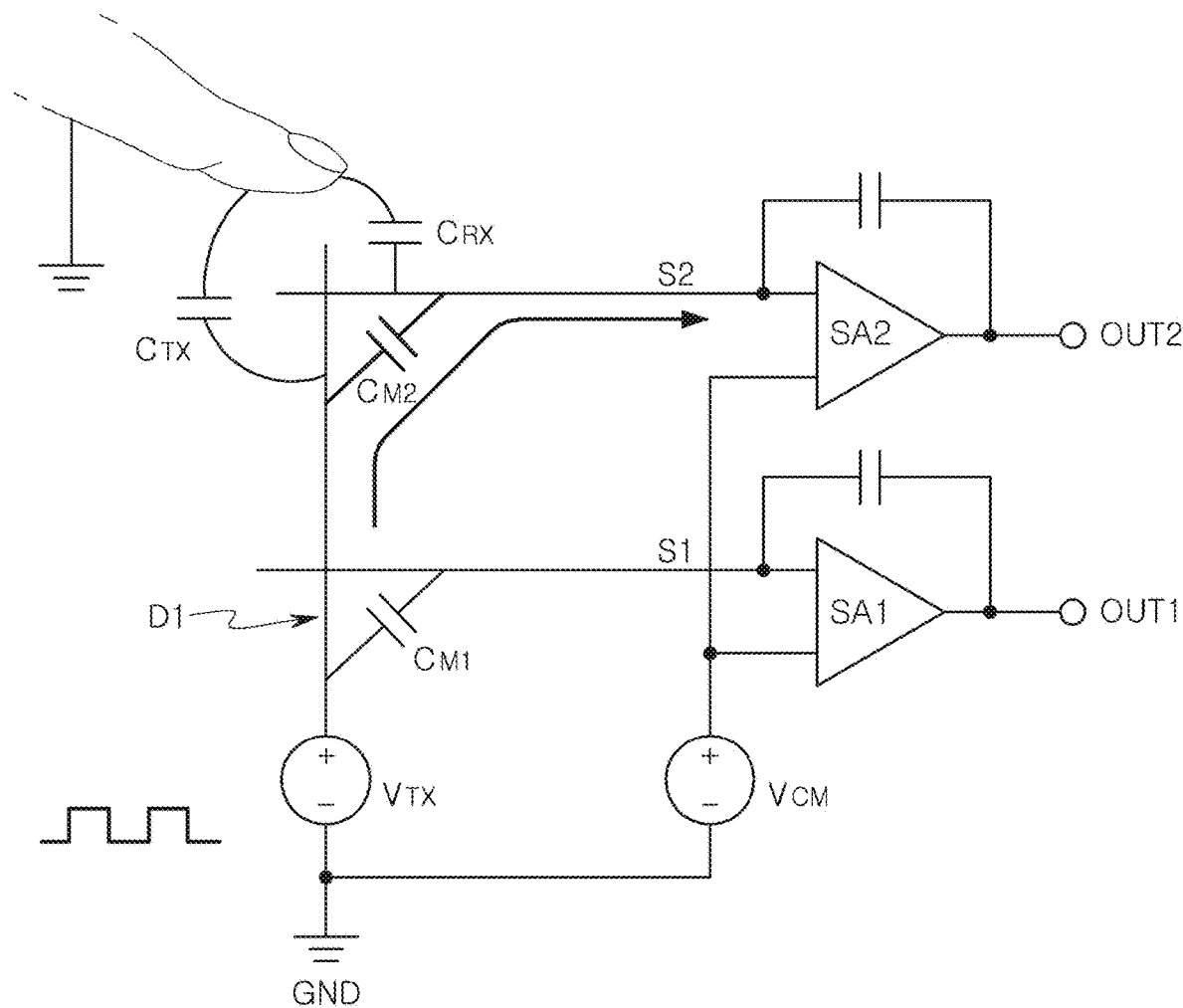
Figure 6:
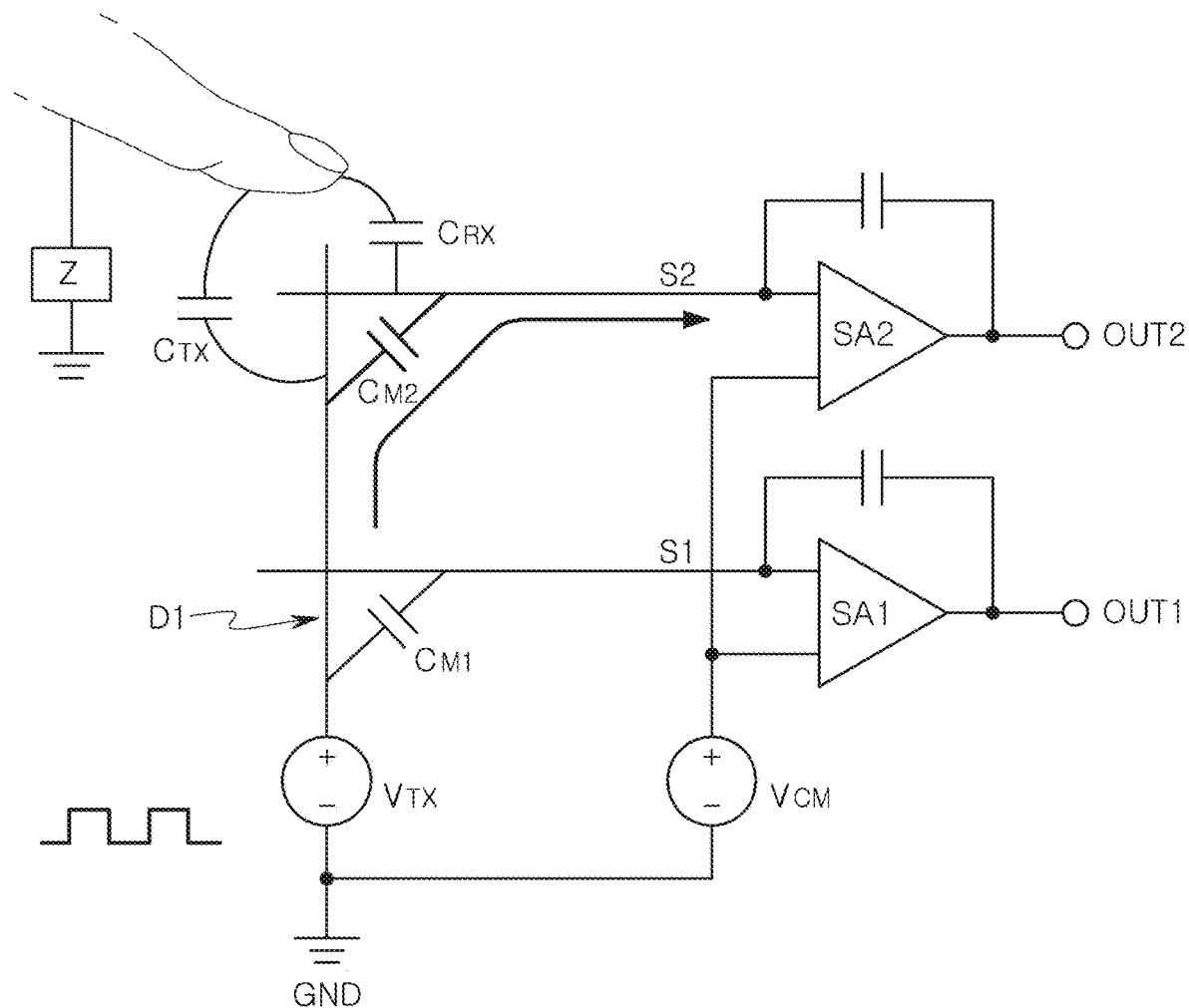

FIGS. 5 and 6 are diagrams illustrating an influence of a change in self-capacitance on a touch sensor that detects a change in mutual capacitance. For example, FIG. 5 corresponds to a case where a grounding state is stable, and FIG. 6 corresponds to a case where the grounding state is unstable.

Referring to FIGS. 5 and 6, a driving signal $V_{TX}$ may be input to the driving electrode DE, first mutual capacitance $C_{M1}$ may be generated between the driving electrode DE and the first sensing electrode SE1, and second mutual capacitance $C_{M2}$ may be generated between the driving electrode DE and the second sensing electrode SE2. For example, the touch input may be applied at a position closer to the second sensing electrode SE2 than the first sensing electrode SE1. Therefore, an output OUT2 of a second sampling circuit SA2 may be larger than an output OUT1 of a first sampling circuit SA1.

Referring to FIGS. 5 and 6, self-capacitances $C_{TX}$ and $C_{RX}$ may be generated in the driving electrode DE and the second sensing electrode SE2, respectively, by a touch input. The self-capacitances $C_{TX}$ and $C_{RX}$ may lead to a degradation of performance of the touch sensor that detects a change in mutual capacitance. As illustrated in FIG. 5, when a grounding state of a user who applies the touch input or an electronic device equipped with the touch sensor is stable, the influence of the self-capacitances $C_{TX}$ and $C_{RX}$ may not be significant.

Meanwhile, as illustrated in FIG. 6, when the grounding state is unstable, the influence of the self-capacitances $C_{TX}$ and $C_{RX}$ may be significant. For example, when the user uses the electronic device equipped with the touch sensor placed on the floor or the like, capacitance of impedance Z between the user's body and a ground terminal may decrease. Accordingly, as the capacitance of the impedance Z decreases, the influence on the self-capacitances $C_{TX}$ and $C_{RX}$ connected in parallel to the impedance Z may increase.

As described above, the change in self-capacitance $C_{TX}$ and $C_{RX}$ caused by the touch input may appear as an increase of capacitance, while the change in mutual capacitance $C_{M1}$ and $C_{M2}$ may appear as a decrease in capacitance. When the grounding state is unstable, the self-capacitance $C_{TX}$ and $C_{RX}$ may be changed due to a change in a potential of the body which applies the touch input, thereby offsetting the change in mutual capacitances $C_{M1}$ and $C_{M2}$. In this case, the coordinates of the touch input may be erroneously recognized or a ghost phenomenon may occur in the process of recognizing a multiple touch.

Figure 7:
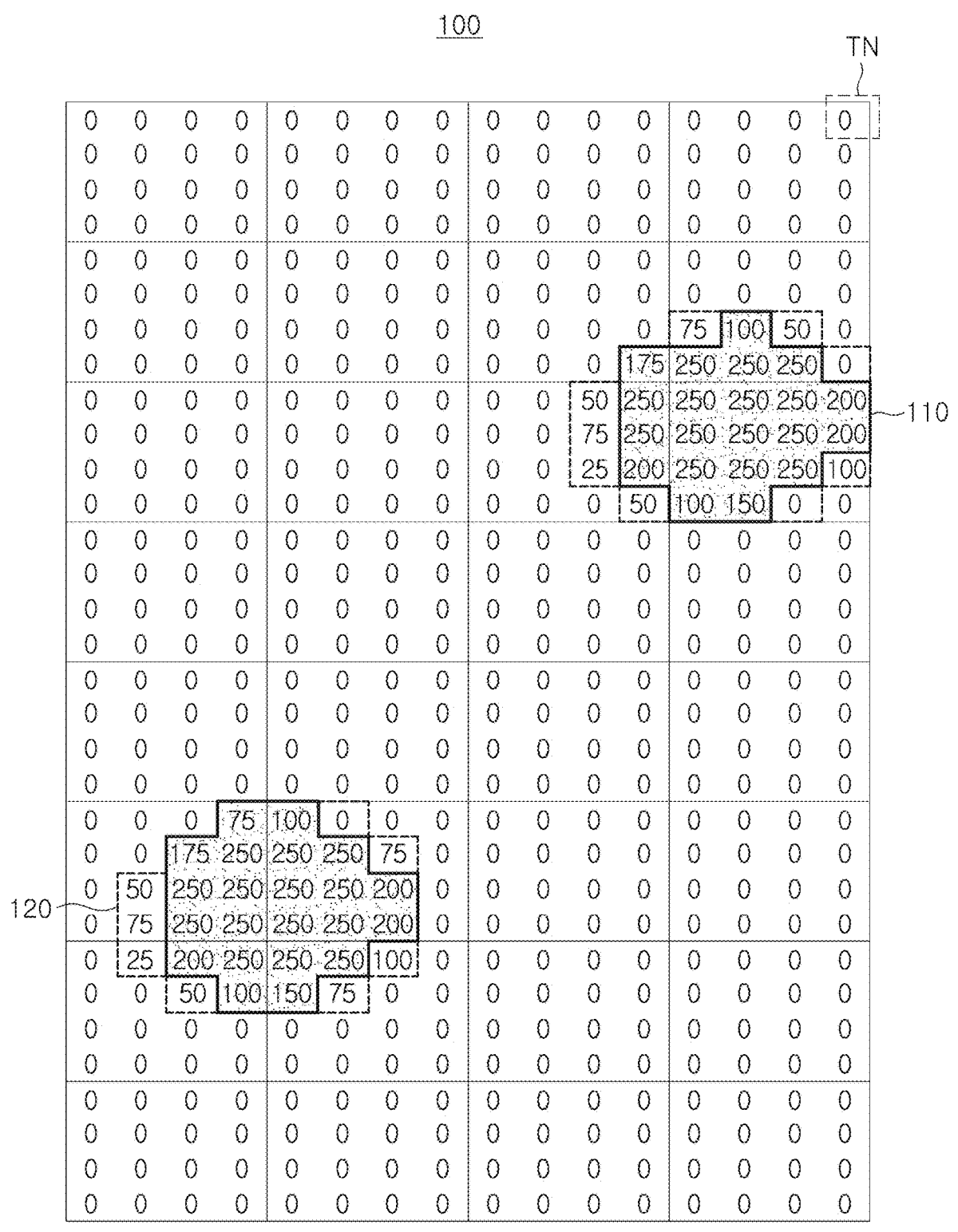
Figure 8:
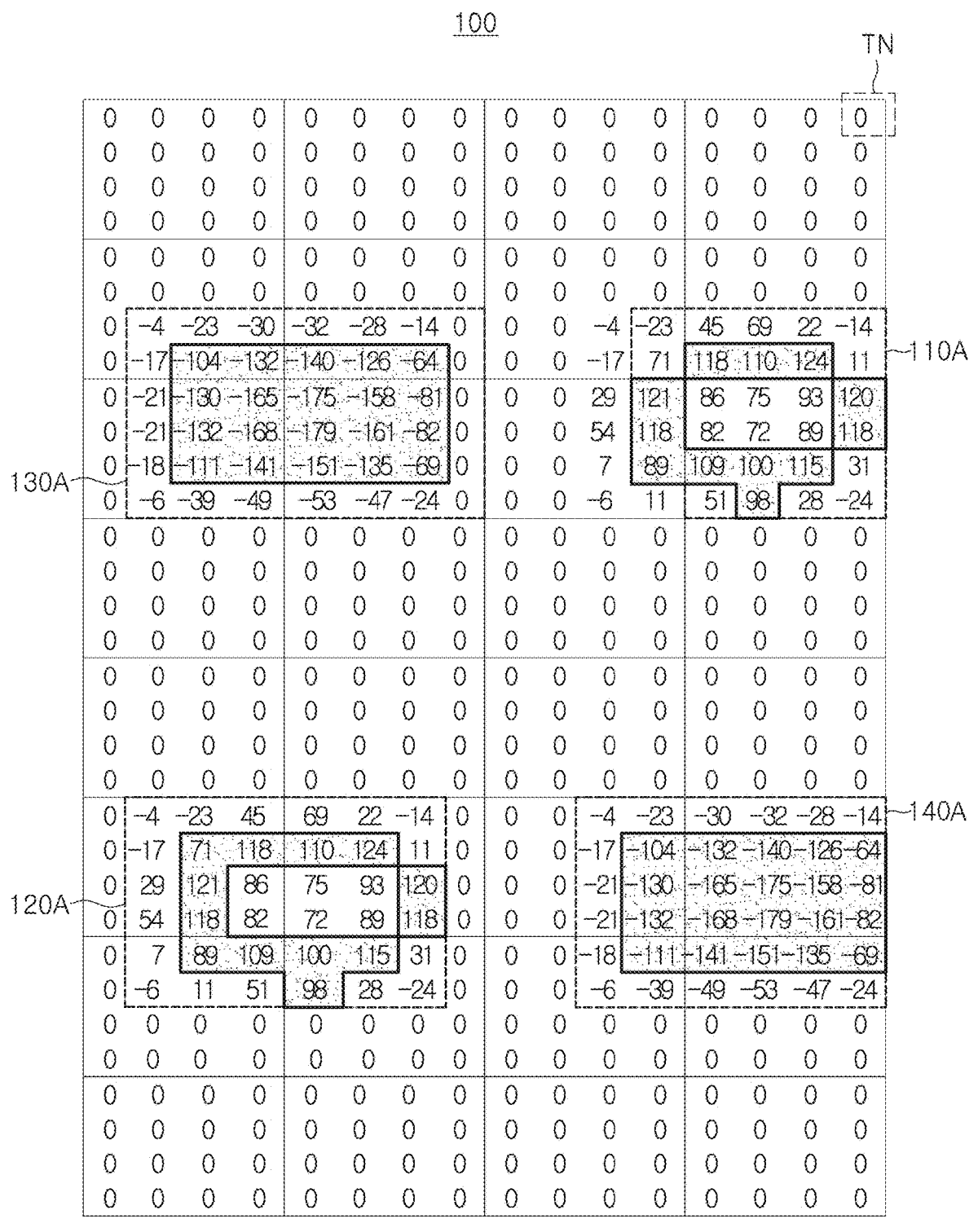

FIGS. 7 and 8 are views illustrating operations of a touch sensor according to an example embodiment in the present disclosure.

In the example embodiment illustrated in FIGS. 7 and 8, the touch sensor 100 may detect a change in mutual capacitance and determine a touch input. FIGS. 7 and 8 illustrate strength of sensing signals generated by the touch nodes TN included in the touch sensor 100 expressed in numerical values in response to a touch input.

First, the example embodiment illustrated in FIG. 7 may correspond to a case where self-capacitance is not significantly changed, for example, to a case where a grounding state is stable. Referring to FIG. 7, a first touch input 110 and a second touch input 120 may be simultaneously generated in the touch sensor 100. Among the touch nodes TN, the touch nodes TN corresponding to the first touch input 110 and the second touch input 120 may output sensing signals, respectively. For example, when a change in mutual capacitance caused by the touch inputs 110 and 120 is defined as a positive (+) sign, sensing signals larger than 9 may appear in the touch nodes TN corresponding to the touch inputs 110 and 120.

Next, the example embodiment illustrated in FIG. 8 may correspond to a case where self-capacitance is significantly changed, for example, to a case where a grounding state is unstable. In the example embodiment illustrated in FIG. 8, the first touch input 110A and the second touch input 120A may be simultaneously generated in the touch sensor 100, as in the example embodiment illustrated in FIG. 7. In this case, self-capacitance may be significantly changed relatively to the case in FIG. 7 and thus affect a sensing signal. Because the change in self-capacitance increases capacitance and the change in mutual capacitance decreases capacitance, the change in self-capacitance may be denoted with a negative (−) sign in the example embodiment of FIG. 8 in which the change in mutual capacitance is denoted with the positive (+) sign.

Therefore, as illustrated in FIG. 8, magnitudes of the sensing signals of the touch nodes TN corresponding to the first touch input 110A and the second touch input 120A may decrease due to the change in self-capacitance. Because the change in self-capacitance is proportional to an area in which each of the touch nodes TN and the touch input overlap each other, a profile of the touch nodes TN corresponding to the first touch input 110A and the second touch input 120A may have a donut shape.

Also, a ghost phenomenon corresponding to the first touch input 110A and the second touch input 120A may occur due to the change in self-capacitance. The ghost phenomenon may be represented by a third touch input 130A and a fourth touch input 140A corresponding to mirroring positions of the first touch input 110A and the second touch input 120A. Because the change in mutual capacitance is rarely present in the third touch input 130A and the fourth touch input 140A, the sensing signal may have a negative (−) sign due to the change in self-capacitance.

In order to solve the above problems, in example embodiments of the present disclosure, driving signals having different phases may be input to at least some of touch nodes adjacent to each other. In the touch nodes receiving the driving signals having different phases, the change in self-capacitances due to the touch input may be offset each other. Therefore, even when the grounding state is unstable, the influence of the change in self-capacitance on the change in mutual capacitance may be effectively reduced and the performance of the touch sensor may be improved.

Figure 9:
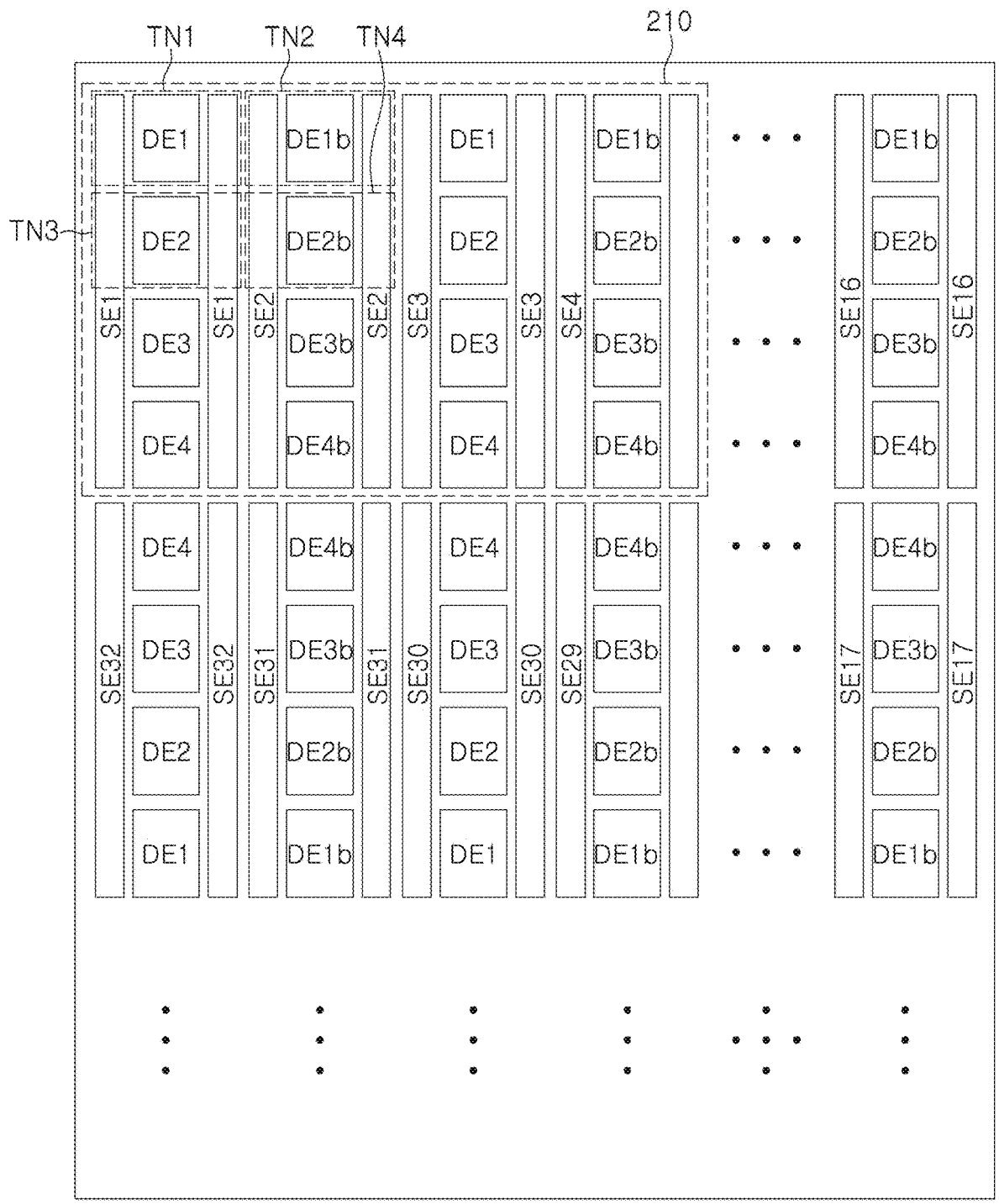
FIG. 9 is a simplified view of a sensor array of a touch sensor according to an example embodiment in the present disclosure.
Figure 10:
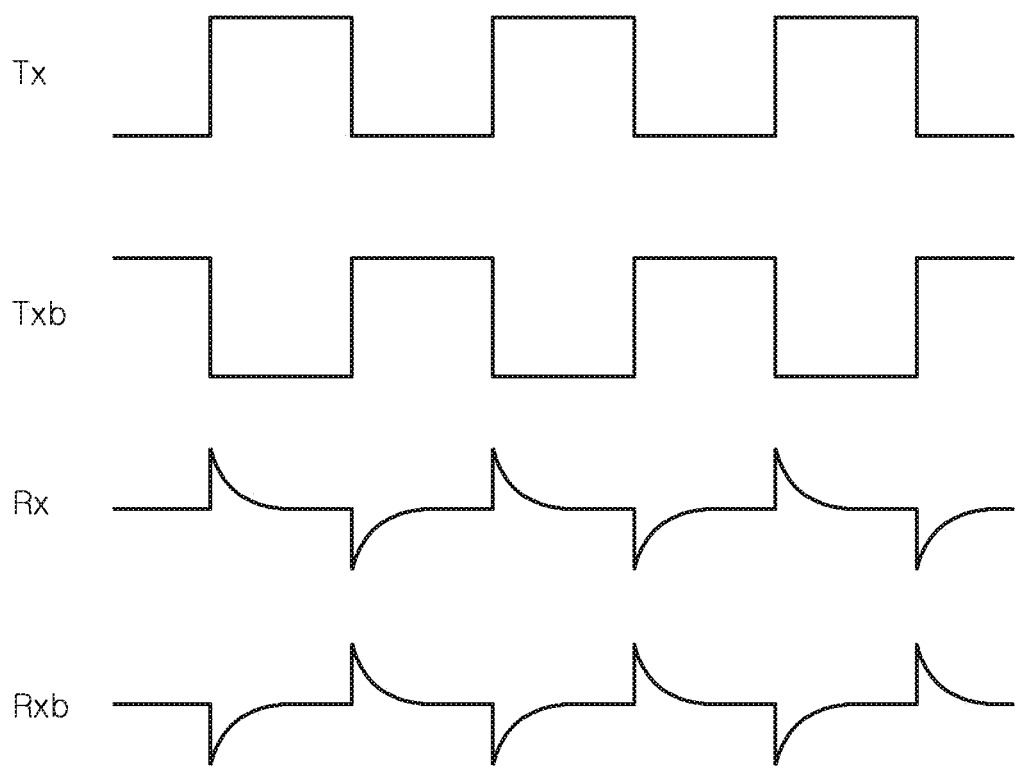
FIG. 10 is a graph illustrating an operation of a touch sensor according to an example embodiment in the present disclosure.

FIG. 9 is a view of a sensor array of a touch sensor according to an example embodiment in the present disclosure. FIG. 10 is a graph illustrating an operation of a touch sensor according to an example embodiment in the present disclosure. FIGS. 11 through 14 are views illustrating operations of a touch sensor according to an example embodiment in the present disclosure.

Referring to FIG. 9, a sensor array 200 of a touch sensor may include a plurality of touch nodes. Each of the touch nodes may include at least one driving electrode DE and at least one sensing electrode SE. The touch nodes may be arranged in a first direction and a second direction, perpendicular to the first direction. For the purposes of description, the first direction and the second direction are defined as a transverse direction and a longitudinal direction, respectively, but the first direction and the second direction may be defined differently according to the example embodiments. In addition, the number of touch nodes, the number of driving electrodes DE, and the number of sensing electrodes SE may be variously modified according to example embodiments.

For example, the driving electrode DE and the sensing electrode SE of each of the touch nodes may be electrically connected to the driving electrode DE and the sensing electrode SE of at least one of the other touch nodes. For example, a first driving electrode DE1 included in a first touch node TN1 may be electrically connected to a first driving electrode DE1 included in another touch node to provide a first driving line. Similarly, a second driving electrode DE1b included in a second touch node TN2 may be electrically connected to a second driving electrode DE1b included in another touch node to provide a second driving line. Further, each of the sensing electrodes SE may be shared by the plurality of touch nodes and may provide a sensing line.

The driving electrode DE and the sensing electrode SE are formed of a conductive material such as a metal and may have a mesh shape including a plurality of metallic wires. As described above, the driving electrode DE and the sensing electrode SE having a mesh shape may be connected to the other driving electrode DE and the other sensing electrode SE by a routing wire or the like. The routing wire may be provided as metallic wires extended by the driving electrode DE or the sensing electrode SE having the mesh shape. The driving electrode De, the sensing electrode SE, and the routing wire may be formed through the same process, which may be different depending on a manufacturing process, though.

The first touch node TN1 may be adjacent to the second touch node TN2 in the first direction and may be adjacent to a third touch node TN3 in the second direction. The first touch node TN1 and the second touch node TN2 may be electrically separated from each other. For example, the first driving electrode DE1 included in the first touch node TN1 and the second driving electrode DE1b included in the second touch node TN2 may be electrically separated from each other, and the first sensing electrode SE1 included in the first touch node TN1 and the second sensing electrode SE2 included in the second touch node TN2 may be electrically separated from each other.

As illustrated in FIG. 9, the sensing electrode SE included in the first touch node TN1 may include a plurality of sub-electrodes, which include a first sub-electrode SE1 (on left) and a second sub-electrode SE1 (on right), and the first driving electrode DE1 may be between the first sub-electrode SE1 (on left) and the second sub-electrode SE1 (on right) in the first direction or the second direction.

In some example embodiments, a length of the first driving electrode, for example, DE1 may be shorter than a length of the sensing electrode, for example, SE1 in at least one of the first direction or the second direction.

The touch sensor may include a plurality of first driving lines, a plurality of second driving lines, a plurality of first sensing lines, and a plurality of second sensing lines.

The plurality of first driving lines each may include a plurality of first driving electrodes, which are physically separate from each other while electrically connected to each other. The plurality of first sensing lines each may include a plurality of first sensing electrodes, which are physically separate from each other while being adjacent to at least one of the plurality of first driving electrodes. The plurality of second driving lines may be electrically separated from the plurality of first driving lines, and each of the plurality of second driving lines may include a plurality of second driving electrodes, which are physically separate from each other while being electrically connected to each other. The plurality of second sensing lines each may include a plurality of second sensing electrodes, which are physically separate from each other while being adjacent to at least one of the plurality of second driving electrodes. First waveforms of first sensing signals of the plurality of second sensing electrodes may be different from second waveforms of second sensing signals of the plurality of first sensing electrodes.

Driving signals having different phases may be input to the first driving electrode DE1 and the second driving electrode DE1b. For example, a first driving signal input to the first driving electrode DE1 and a second driving signal input to the second driving electrode DE1b may have phases opposite to each other. That is, a rising edge interval of the first driving signal may correspond to a falling edge interval of the second driving signal, and a falling edge interval of the first driving signal may correspond to a rising edge interval of the second driving signal. This will be described with reference to FIG. 10 together hereinafter.

Referring to FIG. 10, a first driving signal Tx and a second driving signal Txb may have phases opposite to each other. Accordingly, when a touch input having a similar area is applied to the first touch node TN1 and the second touch node TN2, a first sensing signal Rx and a second sensing signal Rxb may have different waveforms as illustrated in FIG. 10. For example, the first sensing signal Rx may be a sensing signal acquired from the first sensing electrode SE1 of the first touch node TN1, and the second sensing signal Rxb may be a sensing signal acquired from the first sensing node SE2 of the second touch node TN2.

Because the first driving signal Tx and the second driving signal Txb having phases opposite to each other are input to the first touch node TN1 and the second touch node TN2 which are adjacent to each other, an influence of the self-capacitance generated by the touch input on a change in mutual capacitance may be reduced or minimized. Such an effect may be more prominent in an operating environment in which a grounding state is unstable. In a case where a potential of the body of the user who applies the touch input is unstable, because the first driving signal Tx and the second driving signal Txb having phases opposite to each other are input to the first touch node TN1 and the second touch node TN2, respectively, the influence of the self-capacitance according to the touch input may be offset.

A controller connected to the sensor array 200 may simultaneously drive the touch nodes disposed at the same position (e.g., at the same coordinate) in the second direction and acquire a sensing signal. That is, the controller may acquire a sensing signal, while sequentially scanning the touch nodes included in the sensor array 200, and determine the touch input using the acquired sensing signal. This will be described with reference to FIGS. 11 to 14 hereinafter.

Figure 11:
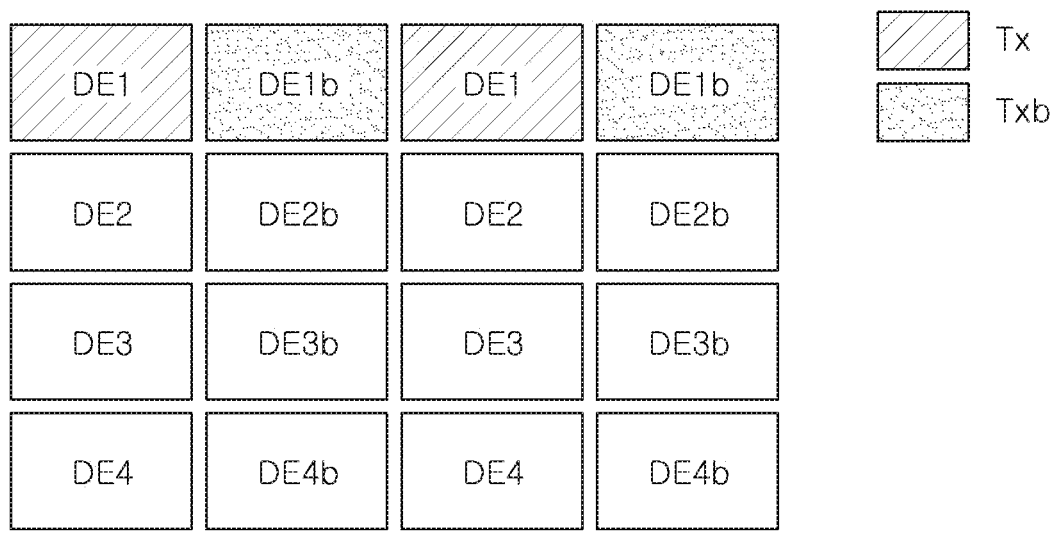
FIGS. 11 through 14 are views illustrating an operation of a touch sensor according to an example embodiment in the present disclosure.
Figure 12:
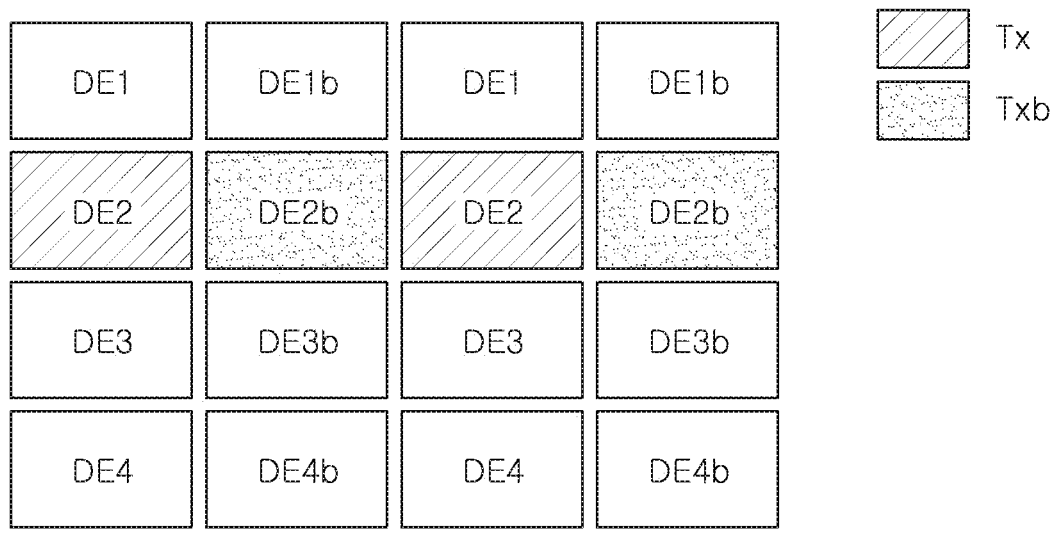

First, FIGS. 11 and 12 may be diagrams illustrating a scanning method for a first region 210 of the sensor array 200 during a first time period and a second time period which are different from each other. Referring to FIG. 11, a first driving signal Tx and a second driving signal Txb may be simultaneously input to the first driving electrode DE1 and the second driving electrode DE1b during the first time period, respectively. During the first time period, the controller may acquire a sensing signal from the sensing electrodes SE. During the second time period subsequent to the first time period, the controller may simultaneously input the first driving signal Tx and the second driving signal Txb to a third driving electrode DE2 and a fourth driving electrode DE2b, respectively. The controller may also acquire a sensing signal from the sensing electrodes SE during the second time period. Each of the first time period and the second time period may correspond to a scan period, and a time for scanning all the touch nodes included in the sensor array 200 may be defined as a frame period. Although the scanning method has been described using the first area 210 as an example, it may be understood that the scanning method described with reference to FIGS. 11 and 12 is applicable to the entire sensor array 200.

Figure 13:
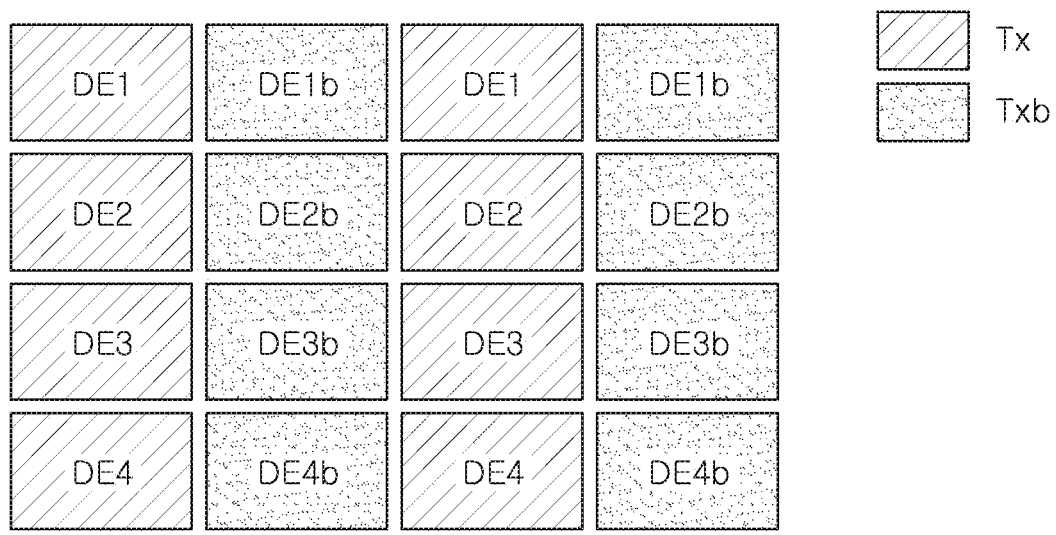
Figure 14:
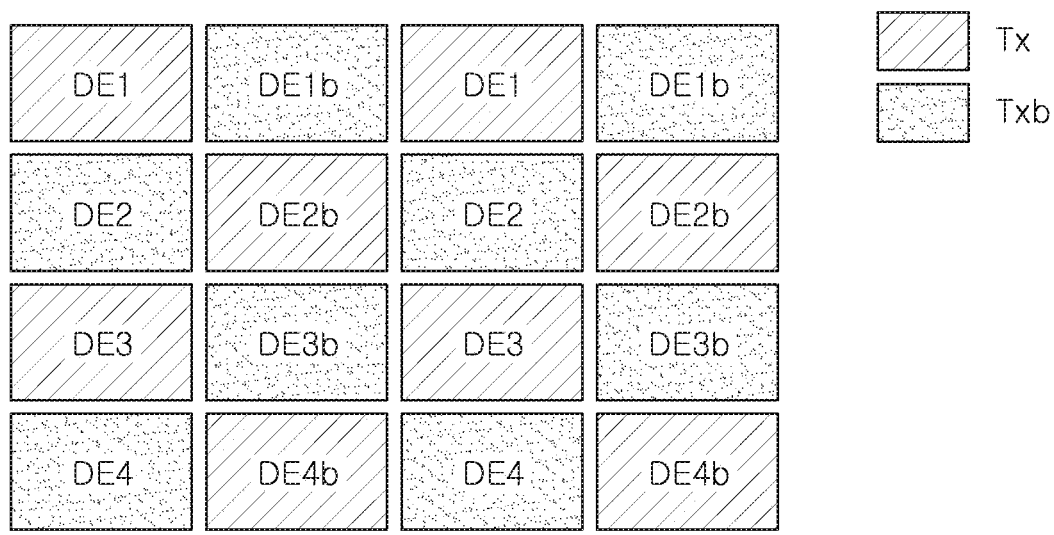

FIGS. 13 and 14 illustrate a method of inputting a first driving signal Tx and a second driving signal Txb to the touch nodes included in the first region 210 during one frame period. Referring to FIG. 13, the same driving signal may be input to the driving electrodes disposed at the same position (e.g., at a same coordinate) in the first direction. For example, the first driving signal Tx may be input to a first driving electrode DE1, a third driving electrode DE2, a fifth driving electrode DE3, and a seventh driving electrode DE4. Meanwhile, the second driving signal Txb having a phase opposite to that of the first driving signal Tx may be input to a second driving electrode DE1b, a fourth driving electrode DE2b, a sixth driving electrode DE3b, and an eighth driving electrode DE4b.

In the example embodiment illustrated in FIG. 14, the method of inputting the driving signals may be changed. Referring to FIG. 14, the driving signals may be input in zigzags. That is, the first driving signal Tx may be input to the first driving electrode DE1, the fourth driving electrode DE2b, the fifth driving electrode DE3, and the eighth driving electrode DE4b, and the second driving signal Txb may be input to the second driving electrode DE1b, the third driving electrode DE2, the sixth driving electrode DE3b, and the seventh driving electrode DE4. In other words, in the example embodiment illustrated in FIG. 14, the method of inputting the first driving signal Tx and the second driving signal Txb may be changed in each scanning period.

In the process of determining the touch input, the controller may change a sign of the sensing signal acquired from the touch nodes receiving the second driving signal Txb. For example, the controller may change the phase of the sensing signal by 180 degrees in an analog domain or change the sign of the sensing signal in a digital domain. On the assumption of the same touch area for respective touch nodes, the sensing signal output by the touch nodes receiving the second driving signal Txb and the sensing signal output by the touch nodes receiving the first driving signal Tx may have different signs. The controller may compensate for a difference in sensing signals of the touch nodes receiving different driving signals by applying separate phase adjustment, a sign changing process, or the like.

Figure 15:
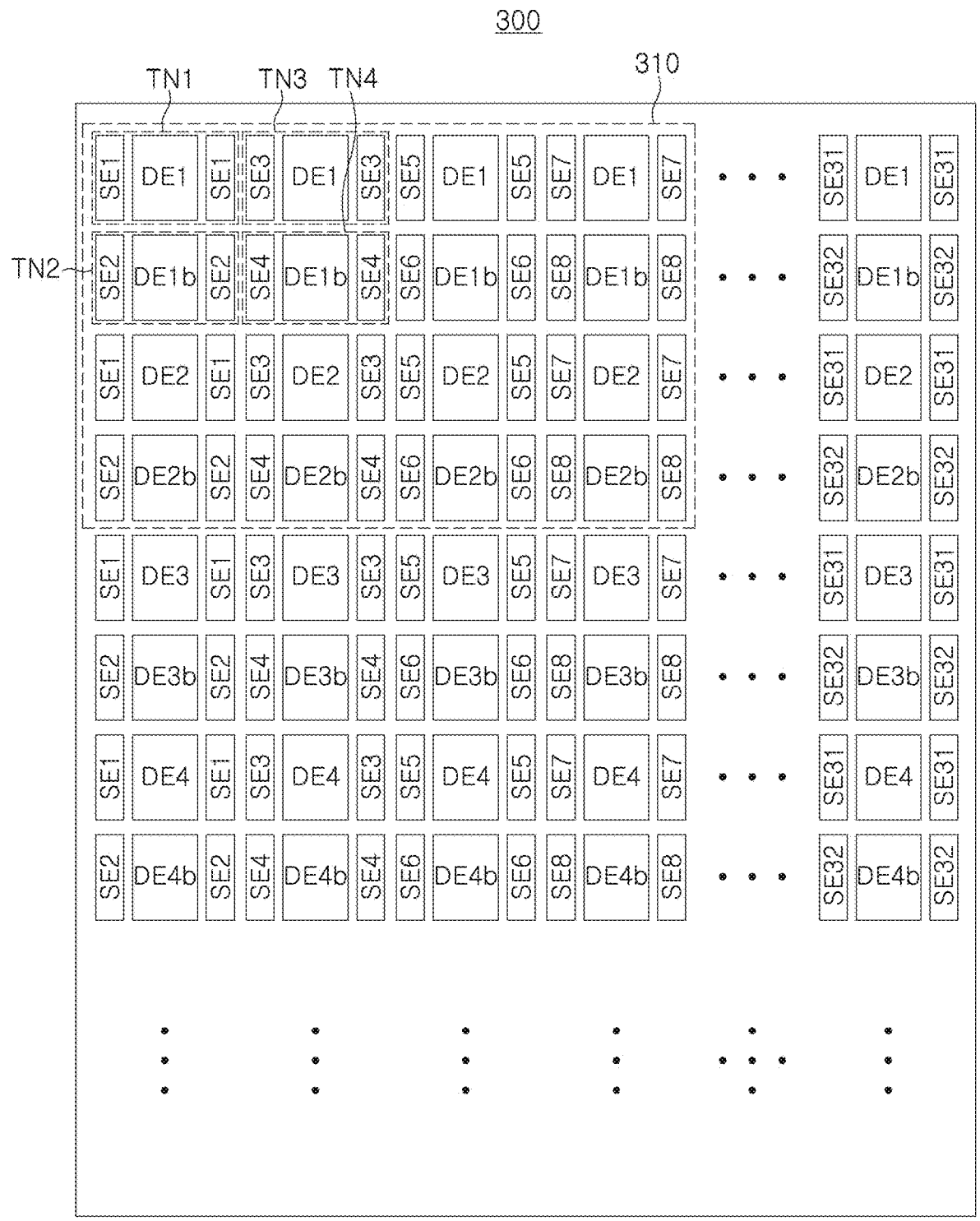
FIG. 15 is a simplified view of a sensor array of a touch sensor according to an example embodiment in the present disclosure.
Figure 16:
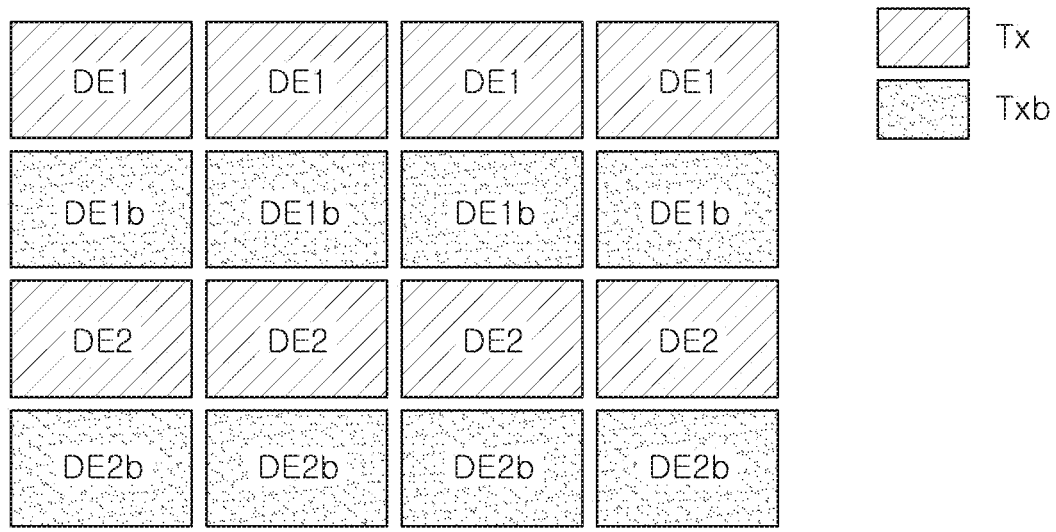
FIG. 16 is a view illustrating an operation of a touch sensor according to an example embodiment in the present disclosure.

FIG. 15 is a simplified view of a sensor array of a touch sensor according to an example embodiment in the present disclosure. FIG. 16 is a view illustrating an operation of a touch sensor according to an example embodiment in the present disclosure.

Referring to FIG. 15, a sensor array 300 of a touch sensor may include a plurality of touch nodes. Each of the touch nodes may include at least one driving electrode DE and at least one sensing electrode SE. The touch nodes may be arranged in a first direction and a second direction, perpendicular to the first direction. For the purposes of description, the first direction and the second direction are defined as a transverse direction and a longitudinal direction, respectively, but the first direction and the second direction may be defined differently according to the example embodiments. In addition, the number of touch nodes, the number of driving electrodes DE, and the number of sensing electrodes SE may be variously modified according to example embodiments.

For example, the driving electrode DE and the sensing electrode SE of each of the touch nodes may be electrically connected to the driving electrode DE and the sensing electrode SE of at least one of the other touch nodes. For example, a first driving electrode DE1 included in a first touch node TN1 may be electrically connected to a first driving electrode DE1 included in a third touch node TN3 to provide one driving line. Similarly, a second driving electrode DE1b included in a second touch node TN2 may be electrically connected to a second driving electrode DE1b included in a fourth touch node TN4 to provide one driving line. Further, each of the sensing electrodes SE may be shared by the plurality of touch nodes and may provide a sensing line. The sensing electrode SE included in each of the touch nodes may be electrically connected to the sensing electrode SE included in another touch node to provide a sensing line. For example, in the example embodiment illustrated in FIG. 15, the sensing electrodes SE indicated by the same reference numerals may be electrically connected to each other by a routing wire or the like.

In an example embodiment illustrated in FIG. 15, a first driving signal and a second driving signal may be simultaneously input to the first driving electrode DE1 and the second driving electrode DE1b, respectively. In other words, the second driving signal having a phase different from that of the first driving signal may be input to the second driving electrode DE1b during the first time period in which the first driving signal is input to the first driving electrode DE1. For example, the first driving signal and the second driving signal may have phases opposite to each other.

The first driving signal and the second driving signal may be input to the third driving electrode DE2 and the fourth driving electrode DE2b during the second time period subsequent to the first time period, respectively. Each of the first time period and the second time period may be defined as a scan period. Because the driving signals are input to the first driving electrode DE1 and the second driving electrode DE1b during the first time period, a sensing signal acquired during the first time period may be determined as a sensing signal acquired from the touch nodes including the first driving electrode DE1 or the second driving electrode DE1b. Similarly, a sensing signal acquired during the second time period may be determined as a sensing signal acquired from the touch nodes including the third driving electrode DE2 or the fourth driving electrode DE2b.

FIG. 16 is a diagram illustrating a method of inputting the first driving signal Tx and the second driving signal Txb to the touch nodes included in the first region 310 during one frame period. Referring to FIG. 16, the same driving signal may be input to the driving electrodes arranged in the first direction. Accordingly, the first driving signal Tx and the second driving signal Txb may be alternately input in the second direction. Further, as described above, the first driving signal Tx and the second driving signal Txb may be simultaneously input to a pair of driving electrodes adjacent to each other in the second direction.

In the example embodiment illustrated in FIG. 16, because the first driving signal Tx and the second driving signal Txb are alternately input, an influence of self-capacitance on a change in mutual capacitance may be effectively offset. A touch region defined by a touch input may include at least two touch nodes in the second direction. Therefore, at least a portion of the self-capacitance generated in each of the touch nodes by the single touch input may have different signs and performance of the touch sensor may be improved.

Figure 17:
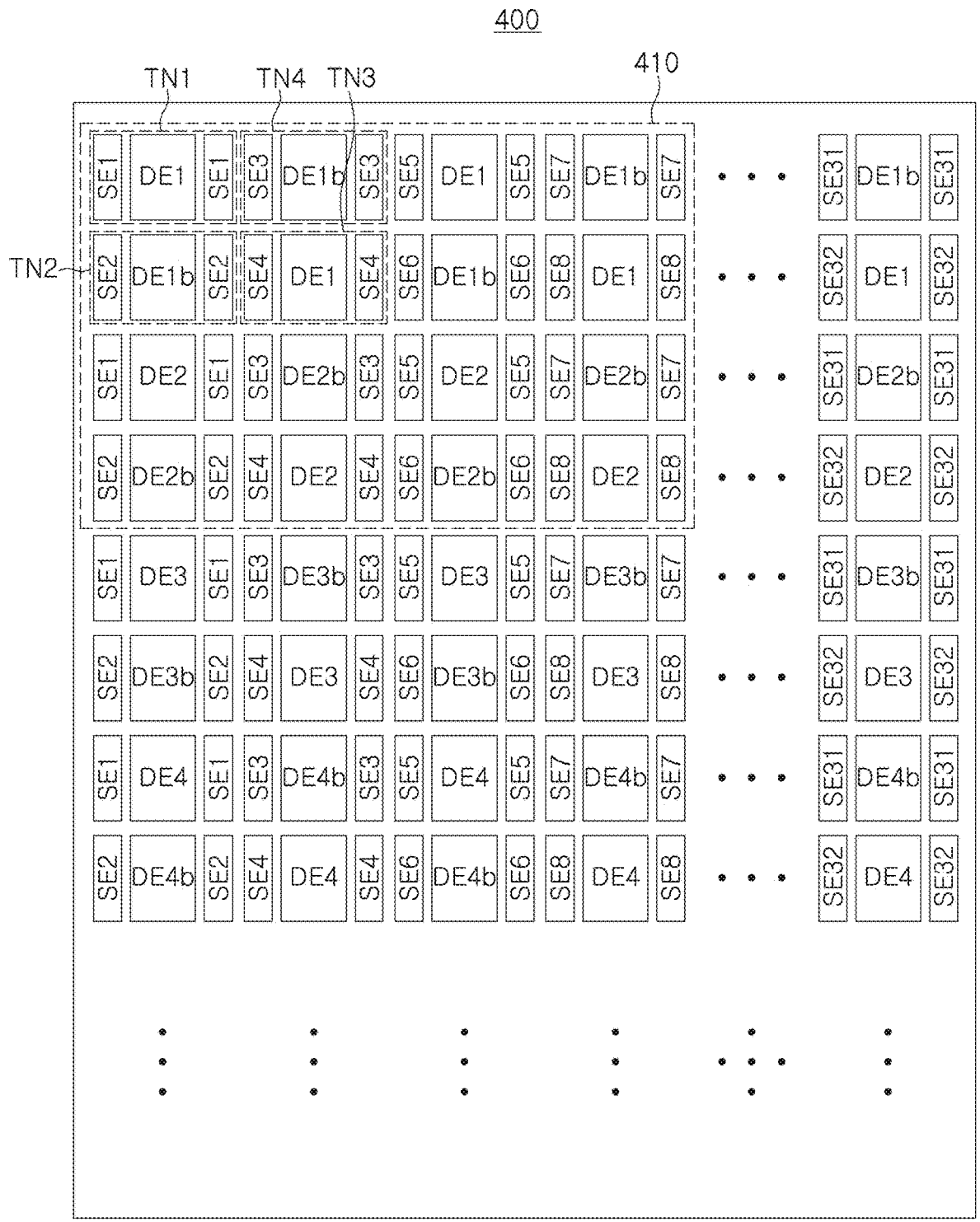
FIG. 17 is a simplified view of a sensor array of a touch sensor according to an example embodiment in the present disclosure.
Figure 18:
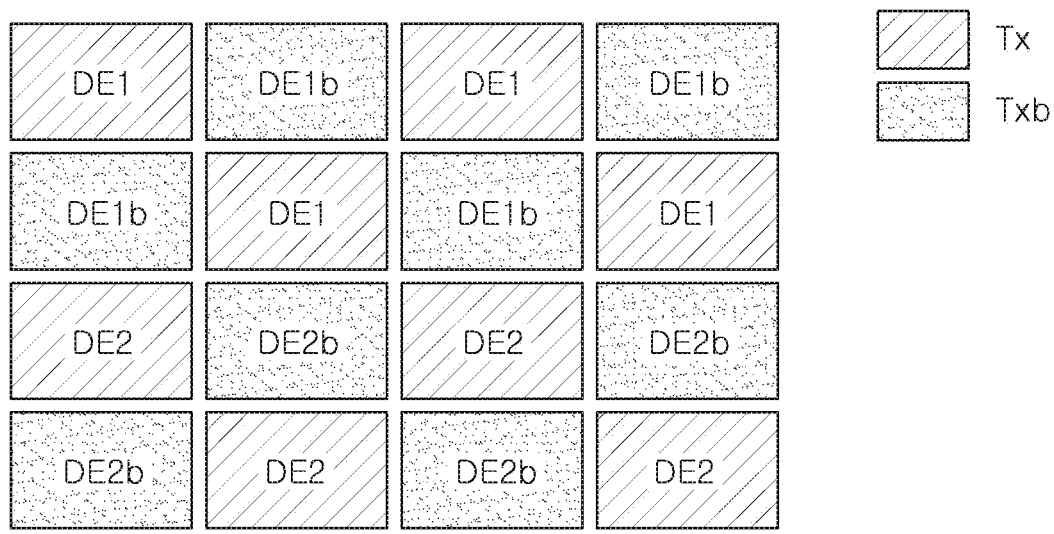
FIG. 18 is a view illustrating an operation of a touch sensor according to an example embodiment in the present disclosure.

FIG. 17 is a simplified view of a sensor array of a touch sensor according to an example embodiment in the present disclosure. FIG. 18 is a view illustrating an operation of a touch sensor according to an example embodiment in the present disclosure.

Referring to FIG. 17, a sensor array 400 of a touch sensor may include a plurality of touch nodes. Each of the touch nodes may include at least one driving electrode DE and at least one sensing electrode SE. The touch nodes may be arranged in a first direction and a second direction, perpendicular to the first direction. For the purposes of description, the first direction and the second direction are defined as a transverse direction and a longitudinal direction, respectively, but the first direction and the second direction may be defined differently according to the example embodiments. In addition, the number of touch nodes, the number of driving electrodes DE, and the number of sensing electrodes SE may be variously modified according to example embodiments.

Compared with the sensor array 300 according to the example embodiment illustrated in FIG. 15, the sensor array 400 according to the example embodiment illustrated in FIG. 17 has a different arrangement of driving electrodes DE. In the sensor array 400 according to the example embodiment illustrated in FIG. 17, the first driving electrode DE1 and the second driving electrode DE1b may be alternately arranged in the first direction. For example, referring to definition of the row lines corresponding to the first direction, the first driving electrode DE1 may be disposed at an odd-numbered position and the second driving electrode DE1b may be disposed at an even-numbered position in a first row. In a second row, the second driving electrode DE1b may be disposed at the odd-numbered position and the first driving electrode DE1 may be disposed at the even-numbered position.

A method of inputting the driving signals to the sensor array 400 may be similar to that described above with reference to FIG. 15. Referring to FIG. 18, a first driving signal Tx may be input to the first driving electrode DE1 and a second driving signal Txb having a phase opposite to that of the first driving signal Tx may be input to the second driving electrode DE1b. The first driving signal Tx and the second driving signal Txb may be simultaneously input to the driving electrodes DE arranged in a pair of adjacent row lines. Because the touch nodes arranged in the pair of adjacent row lines do not share the sensing electrode SE, a touch input may be accurately determined although the first driving signal Tx and the second driving signal Txb are simultaneously input to the pair of row lines.

Figure 19:
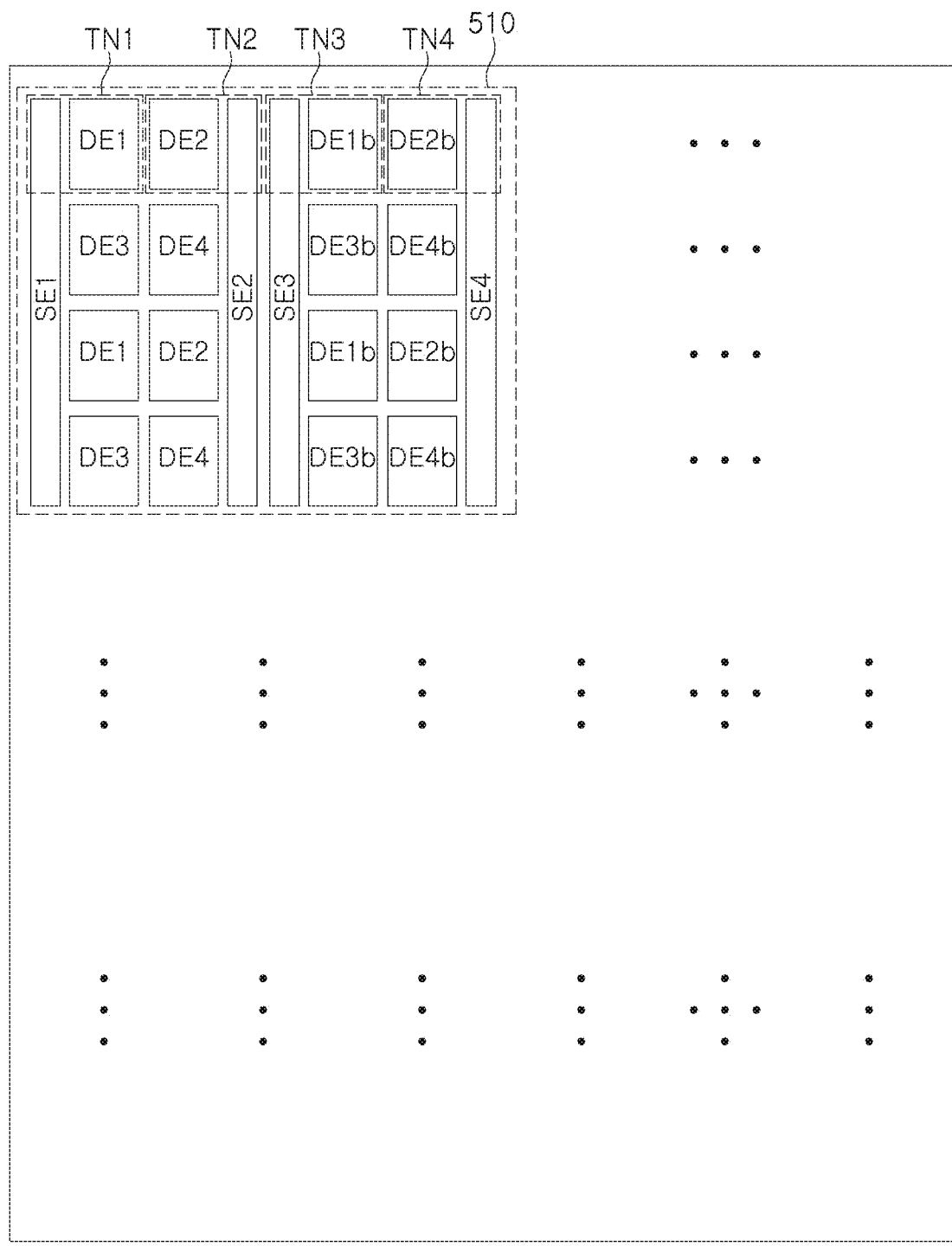
FIG. 19 is a simplified view of a sensor array of a touch sensor according to an example embodiment in the present disclosure.

FIG. 19 is a simplified view of a sensor array of a touch sensor according to an example embodiment in the present disclosure. FIG. 20 is a view illustrating an operation of a touch sensor according to an example embodiment in the present disclosure.

Referring to FIG. 19, in a sensor array 500 of a touch sensor according to an example embodiment in the present disclosure, touch nodes may be arranged in the first direction and the second direction. Similarly to the other example embodiments described above, the first direction is taken as being the transverse direction and the second direction is taken as being the longitudinal direction, but are not limited thereto. In the example embodiment illustrated in FIG. 19, each touch node may include one driving electrode DE and one sensing electrode SE.

For example, a plurality of driving electrodes DE may be arranged between a pair of sensing electrodes SE. In the example embodiment illustrated in FIG. 19, two or more driving electrodes DE may be arranged in the first direction between a pair of sensing electrodes SE adjacent to each other in the first direction. Meanwhile, according to an example embodiment, only one driving electrode DE may be disposed in the first direction between the pair of sensing electrodes SE.

At least some of the two or more driving electrodes DE arranged between the pair of sensing electrodes SE adjacent to each other in the first direction may be electrically connected to each other by a routing wire or the like. For example, some of the driving electrodes DE1 to DE4 arranged between the first sensing electrode SE1 and the second sensing electrode SE2 may be connected to each other. In the example embodiment illustrated in FIG. 19, the first driving electrodes DE1 may be connected to each other, the third driving electrodes DE2 may be connected to each other, the fifth driving electrodes DE3 may be connected to each other, and seventh driving electrodes DE4 may be connected to each other. Similarly, among the driving electrodes DE1b to DE4b arranged between the third sensing electrode SE3 and the fourth sensing electrode SE4, the second driving electrodes DE1b may be connected to each other, the fourth driving electrodes DE2b may be connected to each other, the sixth driving electrodes DE3b may be connected to each other, and the eighth driving electrodes DE4b may be connected to each other.

The sensor array 500 according to the example embodiment illustrated in FIG. 19 may operate in a multi-driving manner. For example, the driving signals may be independently input to the driving electrodes DE1 to DE4 disposed between the first sensing electrode SE1 and the second sensing electrode SE4. In other words, driving signals having the same phase may be input to all the driving electrodes DE1 to DE4, or driving signals having different phases may be input to at least some of the driving electrodes DE1 to DE4.

Driving signals having the opposite phases may be input to the driving electrodes DE1 to DE4 arranged between the first sensing electrode SE1 and the second sensing electrode SE4 and to the driving electrodes DE1b to DE4b arranged between the third sensing electrode SE3 and the fourth sensing electrode SE4. For example, driving signals having the mutually opposite phases may be input to the first driving electrode DE1 and the second driving electrode DE1b.

Figure 20A:
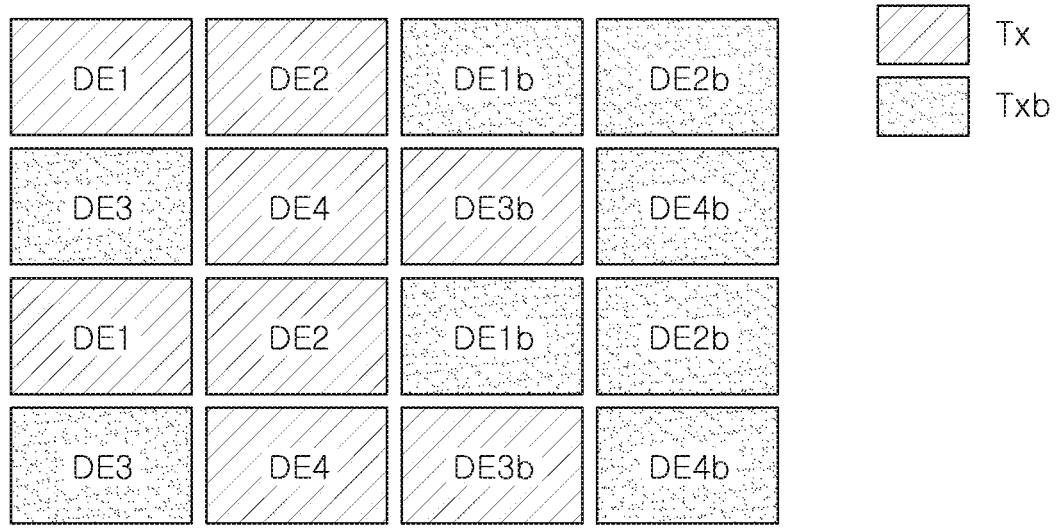
FIGS. 20A and 20B are views illustrating an operation of a touch sensor according to an example embodiment in the present disclosure.
Figure 20B:
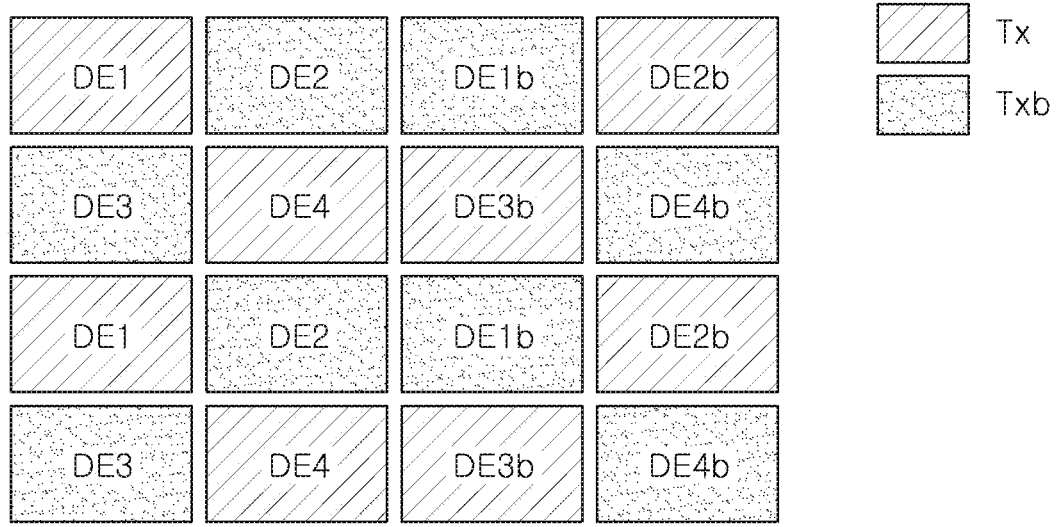

FIGS. 20A and 20B illustrate driving signals input to the touch nodes of a first region 510 of the sensor array 500 during one frame period. Referring to FIG. 20A, during one frame period, the first driving signal Tx may be input to the first driving electrode DE1, the third driving electrode DE2, and the seventh driving electrode DE4 and the second driving signal Txb may be input to the fifth driving electrode DE3. Driving signals having phases opposite to those of the first driving electrode DE1, the third driving electrode DE2, the fifth driving electrode DE3, and the seventh driving electrode DE4 may be input to the second driving electrode DE1b, the fourth driving electrode DE2b, the sixth driving electrode DE3b, and the eighth driving electrode DE4b, respectively.

As described above, the sensor array 500 described above with reference to FIG. 19 may operate in a multi-driving manner, and the phases of the driving signals input to the driving electrodes DE1 to DE4 and DE1b to DE4b may be variously modified. Referring to FIG. 20B, during one frame period, the first driving signal Tx may be input to the first driving electrode DE1 and the seventh driving electrode DE4 and the second driving signal Txb may be input to the third driving electrode DE2 and the fifth driving electrode DE3. The second driving signal Txb may be input to the second driving electrode DE1b and the eighth driving electrode DE4b and the first driving signal Tx may be input to the fourth driving electrode DE2b and the sixth driving electrode DE3b. A method of inputting the driving signals regarding the sensor array 500 operating in the multi-driving manner may be variously modified in addition to the method described above with reference to FIGS. 20A and 20B.

Figure 21:
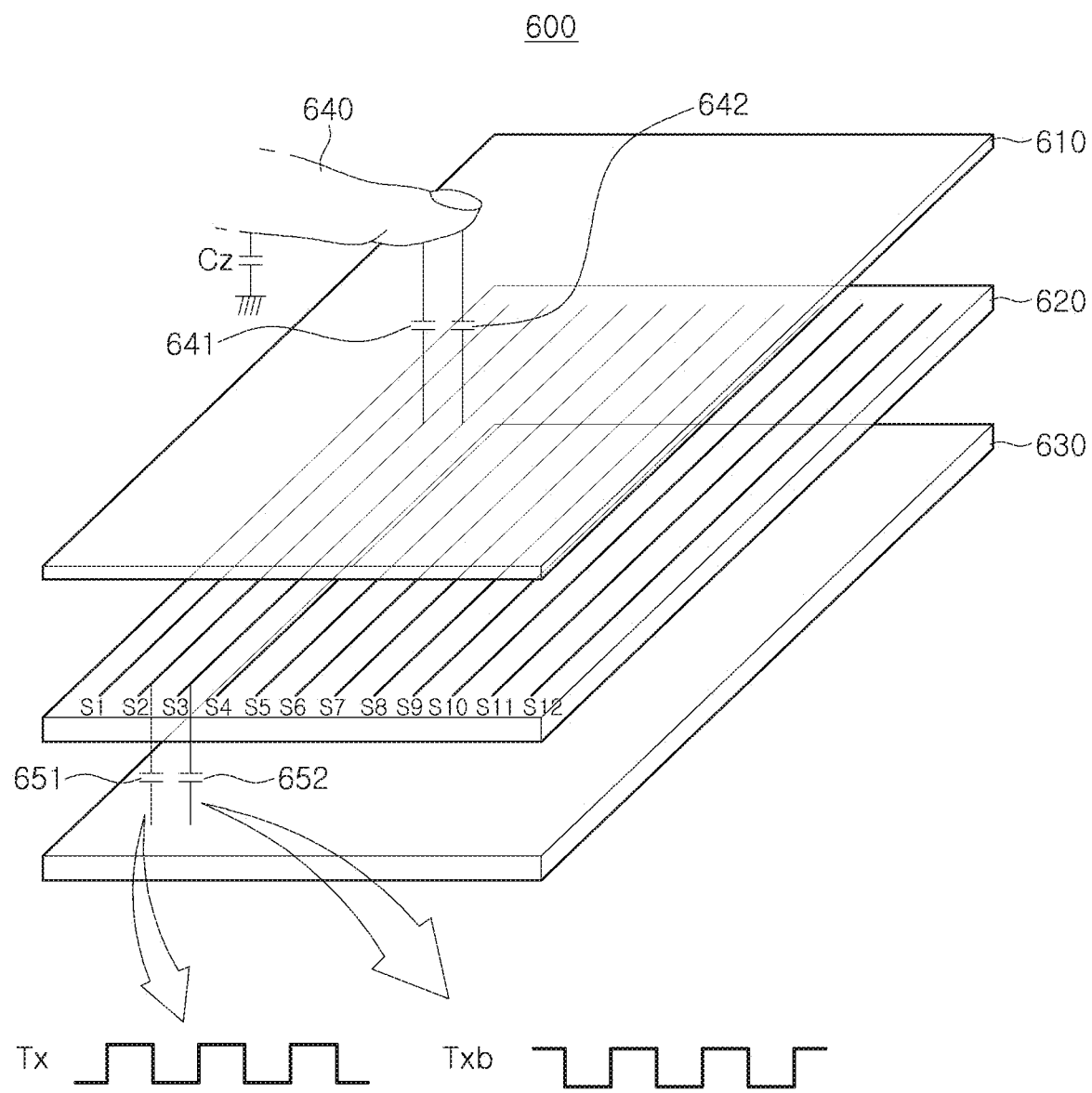
FIG. 21 is a view illustrating an effect of a touch sensor according to an example embodiment in the present disclosure.

FIG. 21 is a simplified view of an electronic device including a touch sensor according to an example embodiment in the present disclosure.

Referring to FIG. 21, an electronic device 600 according to an example embodiment in the present disclosure may include a cover glass 610, a touch sensor 620, a display 630, and the like. The cover glass 610 may be disposed above the touch sensor 620 and receive a touch input from a touch object 640 through a front surface. The touch input may cause self-capacitances 641 and 642, which are determined according to an area of the touch object 640, a thickness and permittivity of the cover glass 610, and the like, to be generated.

The touch sensor 620 may include a plurality of electrodes S1 to S12. The number, arrangement, configuration, and the like, of the plurality of electrodes S1 to S12 included in the touch sensor 620 may be variously modified according to example embodiments. Parasitic capacitances 651 and 652 may be generated between the electrodes S1 to S12 and the display 630, and the parasitic capacitances 651 and 652 may affect an operation of the touch sensor 620 and the display 630. For example, the touch sensor 620 cannot accurately detect a touch input, as the parasitic capacitances 651 and 652 affect the touch sensor 620. In an example embodiment in the present disclosure, the effect of the parasitic capacitances 651 and 652 on the touch sensor 620 may be determined based on a signal input to the display 630, for example, a signal input to gate lines or/and source lines of the display 630.

Also, flicker may occur in the display 630 due to the parasitic capacitances 651 and 652. For example, a change in the magnitudes of the parasitic capacitances 651 and 652 may be affected by a capacitance $C_Z$ connected between the touch object 640 and a ground terminal, and if a grounding state of the touch object 640 is unstable, a change in the capacitances 651 and 652 may increase. In an example embodiment in the present disclosure, the effect of the parasitic capacitances 651 and 652 on the display 630 may be determined based on a signal input to the touch sensor 620, for example, a driving signal input to the touch sensor 620.

For example, an intermediate insulating layer may be further included between the touch sensor 620 and the display 630, and a thickness of the intermediate insulating layer may be decreased as a thickness of the electronic device 600 is decreased. Due to a reduction of the thickness of the intermediate insulating layer, a magnitude of the parasitic capacitances 651 and 652 can be increased, and an influence of the parasitic capacitances 651 and 652 between the touch sensor 620 and the display 630 may increase.

In an example embodiment in the present disclosure, driving signals having phases opposite to each other may be input to some electrodes adjacent to each other among the electrodes S1 to S12 of the touch sensor 620. For example, as illustrated in FIG. 21, the first driving signal Tx may be input to the second electrode S2, and the second driving signal Txb having a phase opposite to that of the first driving signal Tx may be input to the third electrode S3.

In an example embodiment in the present disclosure, by inputting the driving signals having mutually opposite phases, the influence of the parasitic capacitances 651 and 652 reflected on the display in the second electrode S2 and the third electrode S3, respectively, may be offset. Therefore, flicker or the like that may appear on the display 630 in an operating environment in which a grounding state of the touch object 640 or the electronic device 600 is unstable may be solved or mitigated and performance of the electronic device 600 may be improved. Hereinafter, a description will be provided in more detail, with reference to FIGS. 22 to 24.

Figure 22:
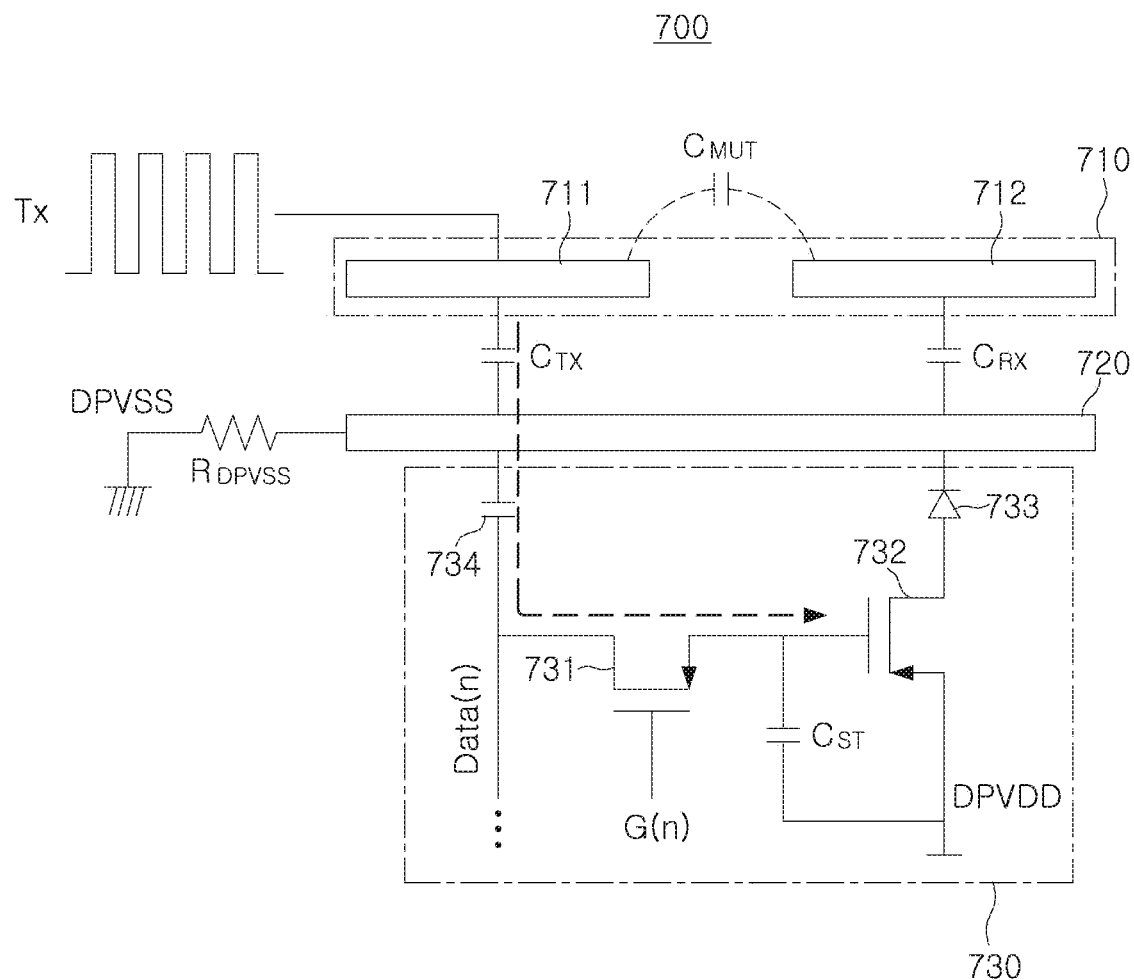
FIGS. 22 and 23 are views illustrating operations of a touch sensor and a display according to an example embodiment of the present disclosure.
Figure 23:
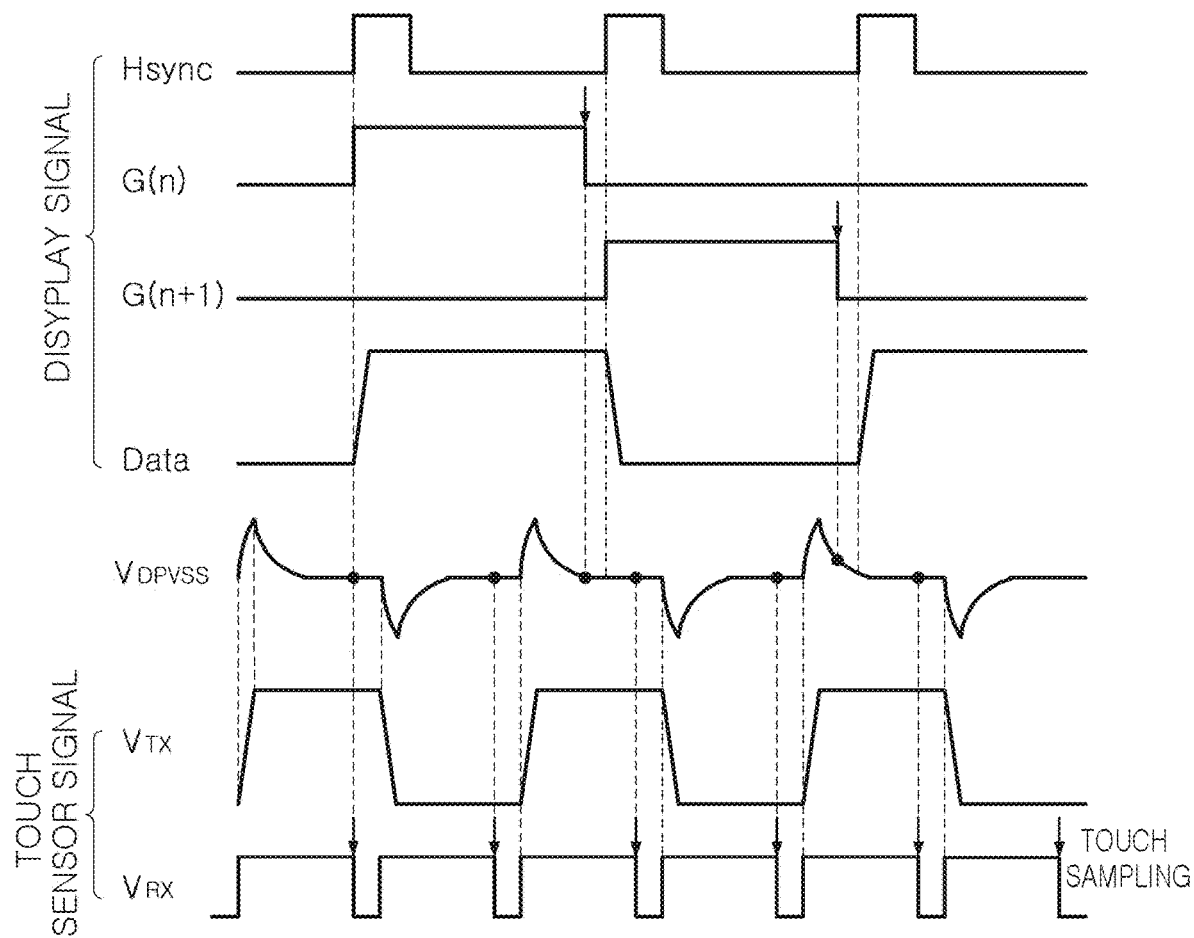
Figure 24:
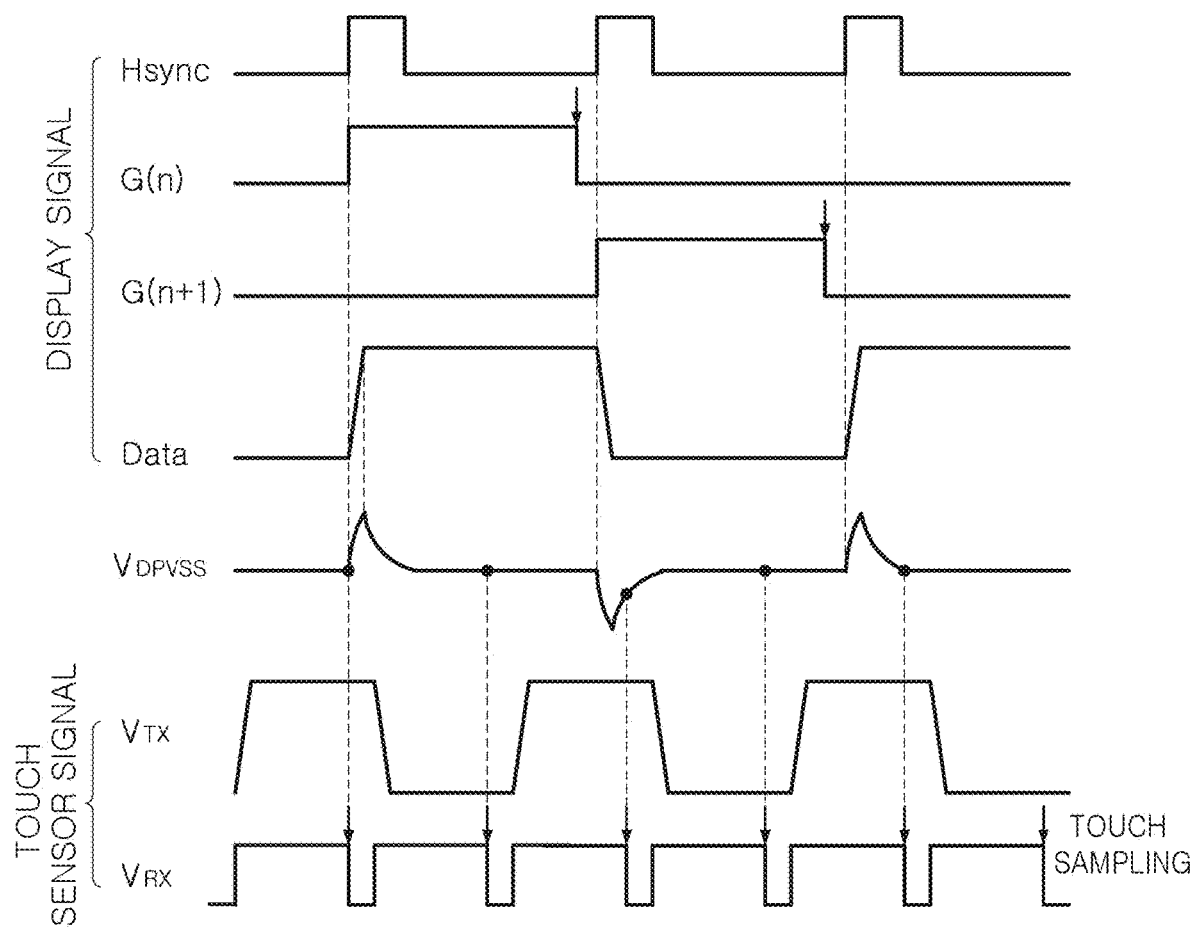
FIGS. 24 to 26C are views illustrating operations of a touch sensor according to an example embodiment of the present disclosure.

FIGS. 22 to 24 are views illustrating operations of a touch sensor and a display according to an example embodiment of the present disclosure.

First, referring to FIG. 22, an electronic device 700 may include a touch sensor 710 and a display 730, and an intermediate insulating layer 720 may be disposed between the touch sensor 710 and the display 730. The touch sensor 710 may include a driving electrode 711 and a sensing electrode 712, and a driving signal $T_x$ may be input to the driving electrode 711. Mutual capacitance $C_{MUT}$ by the driving signal $T_x$ may be generated between the driving electrode 711 and the sensing electrode 712. When a touch object approaches the touch sensor 710, a change in mutual capacitance $C_{MUT}$ may occur by the touch object. The touch sensor 710 may detect the change in mutual capacitance $C_{MUT}$ through the sensing electrode 712, and determine a touch input by the touch object.

The display 730 may include a plurality of pixels, each of which may include one or more transistors 731 and 732, an organic light emitting element 733, and the like. In FIG. 22, it is assumed that the display 730 is an organic light emitting display including the organic light emitting element 733. However, various other display devices may be employed in the electronic device 700.

A first transistor 731 may receive a gate signal G(n) and a source signal Data(n). When the first transistor 731 is turned on by the gate signal G(n) and the source signal Data(n) is input, a storage capacitor $C_{ST}$ may be charged. A second transistor 732 may be connected to a display power node DPVDD, and may operate by a charge charged in the storage capacitor $C_{ST}$. The second transistor 732 may turn on the organic light emitting element 733 to a desired (or alternatively, predetermined) brightness by inputting a current determined by the charge charged in the storage capacitor $C_{ST}$ to the organic light emitting element 733.

The intermediate insulating layer 720 may be connected to a display common node DPVSS. For example, a resistor $R_{DPVSS}$ may be present between the intermediate insulating layer 720 and the display common node DPVSS. First capacitance $C_{TX}$ may be generated between the intermediate insulating layer 720 and the driving electrode 711, and second capacitance $C_{RX}$ may be generated between the intermediate insulating layer 720 and the sensing electrode 712. In addition, parasitic capacitance 734 may be generated between the intermediate insulating layer 720 and the first transistor 731 of the display 730.

Referring to FIG. 22, the driving signal $T_x$ input to the driving electrode 711 may be introduced into the pixel of the display 730 through the first capacitance $C_{TX}$ and the parasitic capacitance 734. The source signal Data(n) may be introduced into the touch sensor 710 through the first capacitance $C_{TX}$ and the parasitic capacitance 734. For example, the touch sensor 710 and the display 730 may affect each other. Therefore, accuracy may be degraded in the operation of the touch sensor 710, or flicker noise or the like may be generated on a screen output by the display 720.

FIG. 23 includes timing diagrams provided to illustrate an effect by which the touch sensor 710 may affect the display 730. Referring to FIG. 23, a display signal, a touch sensor signal, and a common display voltage $V_{DPVSS}$ are illustrated. Hereinafter, operations of the touch sensor 710 and the display 730 will be described, together with FIG. 22.

Referring to FIG. 23, the display 730 may operate according to a horizontal periodic signal $H_{sync}$. A single period in the horizontal periodic signal $H_{sync}$ may be a time at which one gate line of the gate lines included in the display 730 is activated and image data is input to pixels connected to the activated gate line. Accordingly, as illustrated in FIG. 23, an $n^{th}$ gate signal G(n) may be activated in the first period of the horizontal periodic signal $H_{sync}$, and an $n+1^{th}$ gate signal G(n+1) may be activated in the second period of the horizontal periodic signal $H_{sync}$. The source signal Data corresponding to the image data may be input for each period of the horizontal periodic signal $H_{sync}$.

A driving signal $V_{TX}$ may be input to the driving electrode 711 of the touch sensor 710, and a sensing circuit may detect a change in capacitance from the sensing electrode 712 at each touch sampling point in time in response to a sensing control signal $V_{RX}$. As described above with reference to FIG. 22, the first capacitance $C_{TX}$ may exist between the driving electrode 711 and the intermediate insulating layer 720. Accordingly, as illustrated in FIG. 23, the common display voltage $V_{DPVSS}$ input to the intermediate insulating layer 720 may increase and decrease in rising and falling periods of the driving signal $V_{TX}$, which may act as noise to the display 730 and may cause a flicker phenomenon. For example, referring to FIG. 23, the common display voltage $V_{DPVSS}$ may have a value greater than a normal value at a point in time at which the source signal Data is input to the n+1$^{th}$ gate line.

In addition, the parasitic capacitance 734 may exist between the pixel of the display 730 and the intermediate insulating layer 720. Therefore, as illustrated in FIG. 24, the common display voltage $V_{DPVSS}$ input to the intermediate insulating layer 720 may increase and decrease in rising and falling periods of the source signal Data. For example, when a period in which the common display voltage $V_{DPVSS}$ increases or decreases due to the source signal Data overlaps a touch sampling point in time by the sensing control signal $V_{RX}$, an error may occur in the touch input sensed by the touch sensor 710. For example, referring to FIG. 24, the common display voltage $V_{DPVSS}$ may have a value less than a normal value at a third touch sampling time.

In the present disclosure, various methods for minimizing the effect of the touch sensor 710 and the display 730 may be provided. Accordingly, performance degradation of the touch sensor 620 and the display 630 due to the parasitic capacitance 734 may be minimized. Hereinafter, a description will be given with reference to FIGS. 25 to 28.

Figure 25:
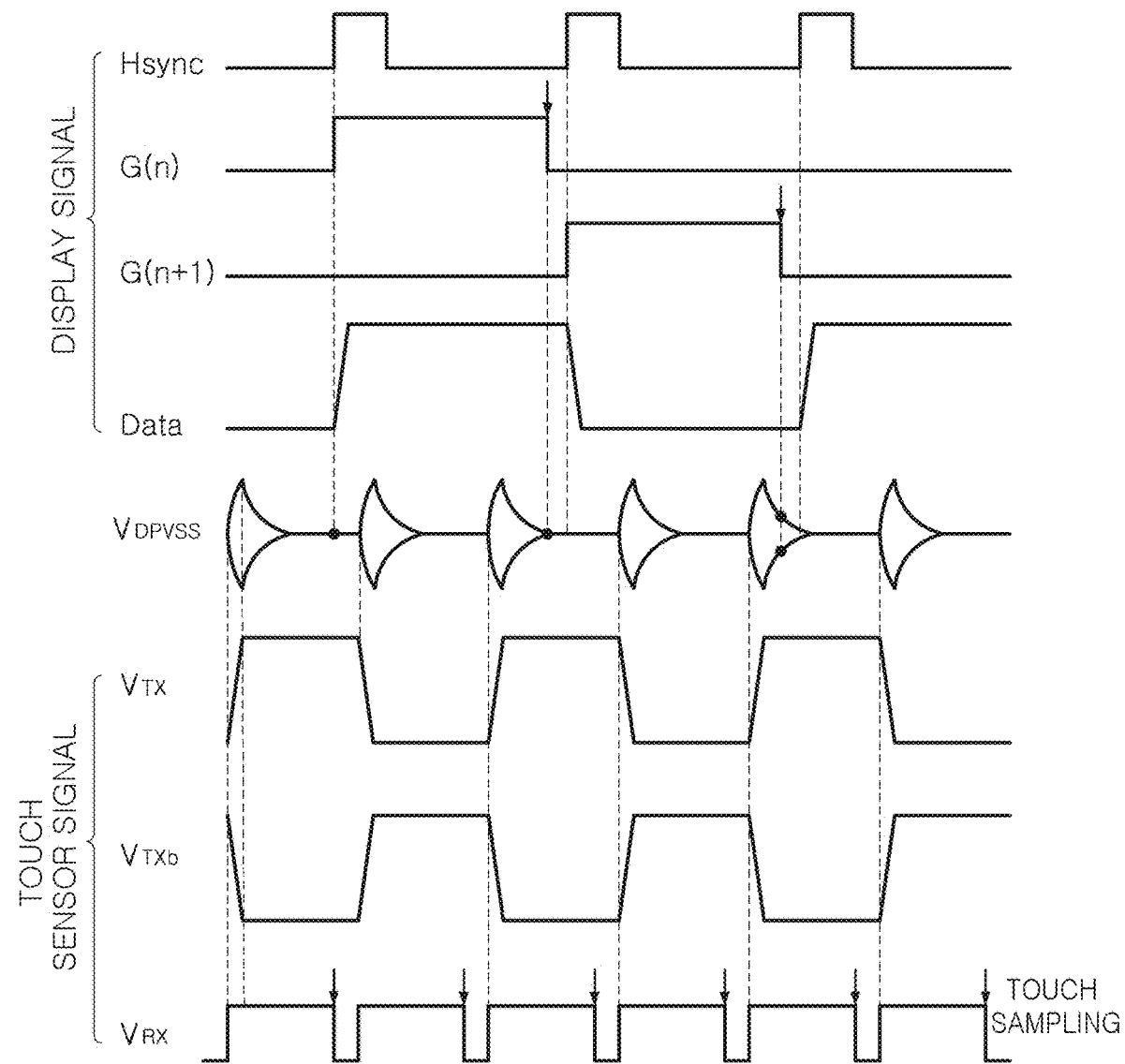
Figure 26A:
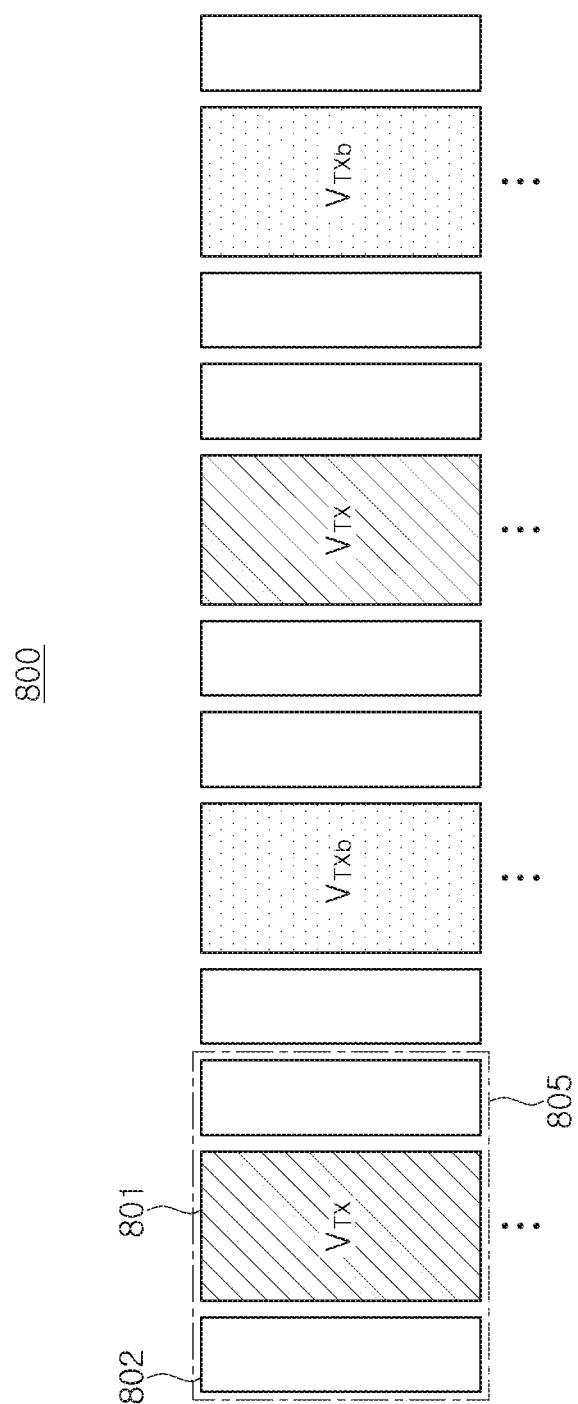
Figure 26B:
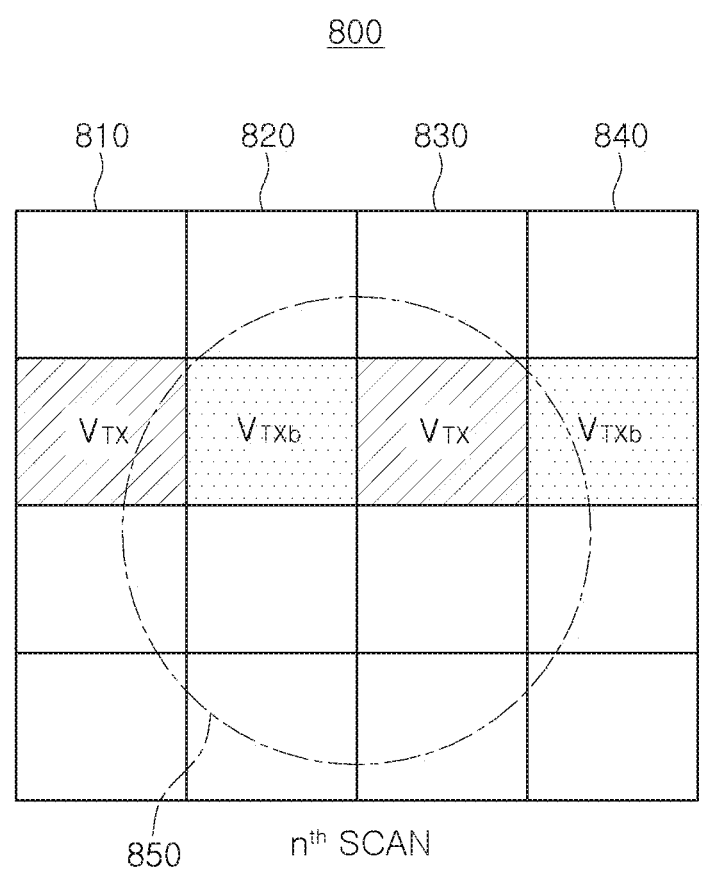
Figure 26C:
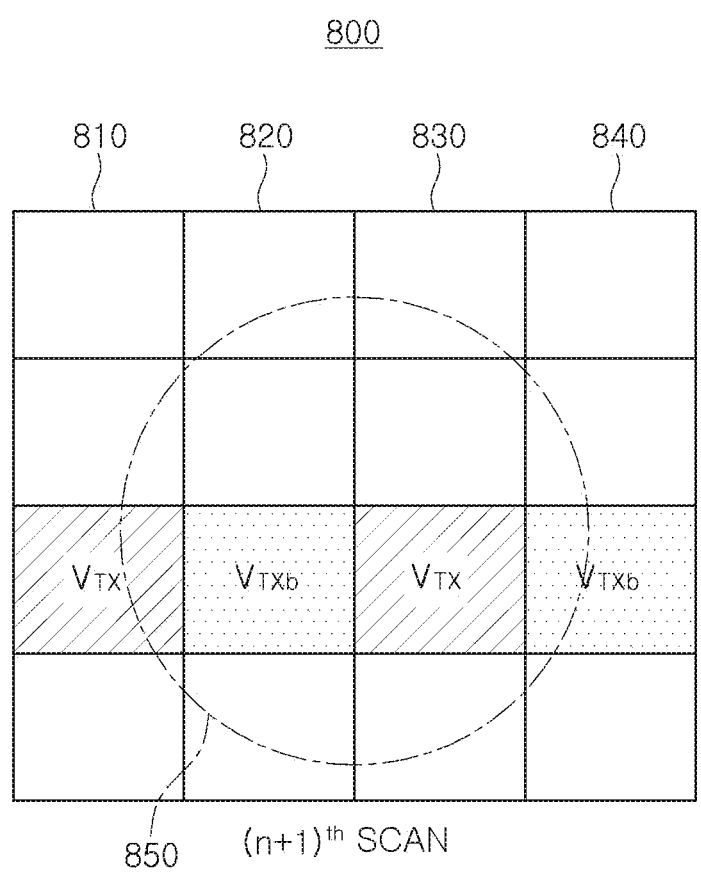
Figure 27:
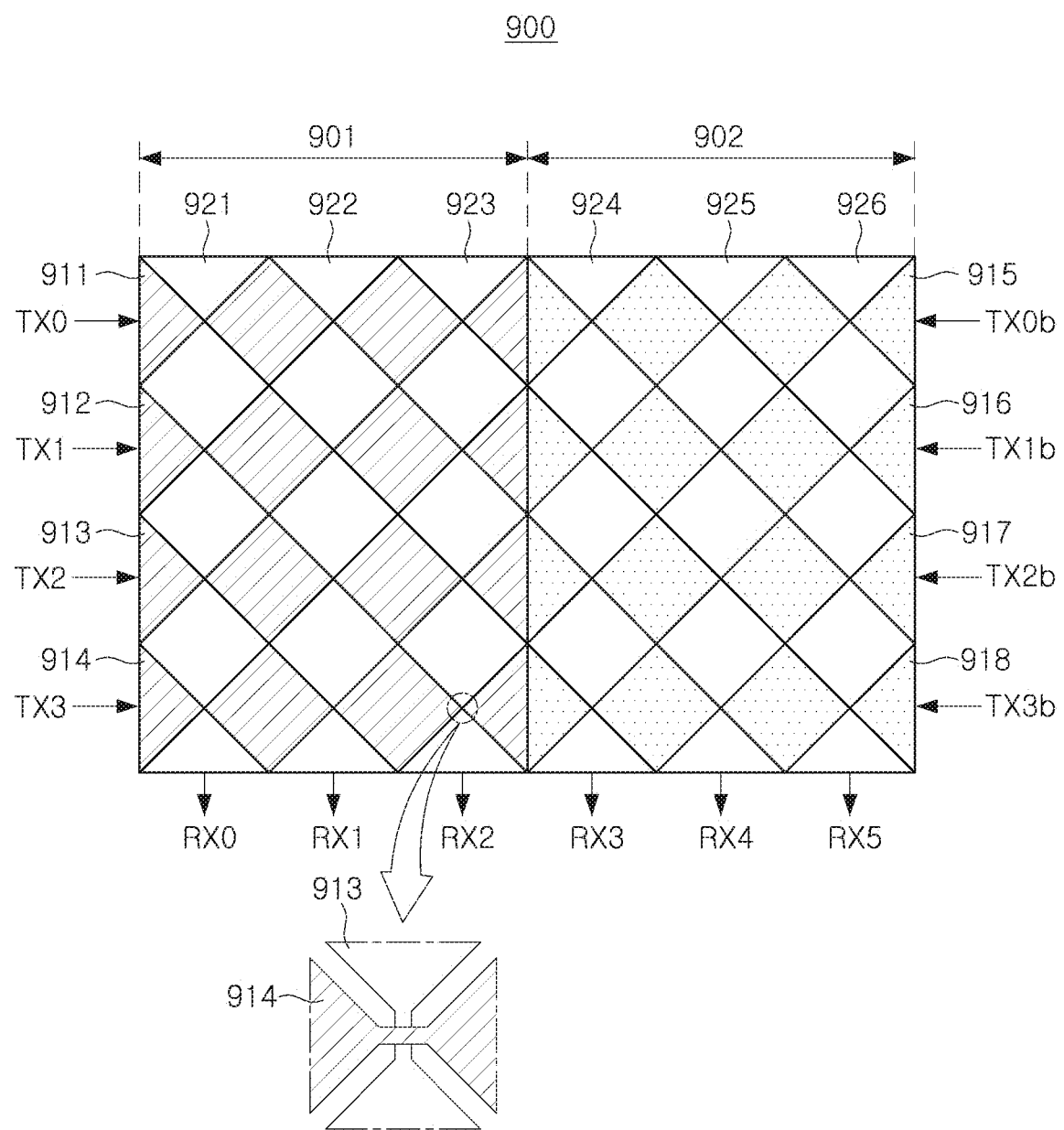
FIGS. 27 and 28 are views illustrating operations of a touch sensor according to an example embodiment of the present disclosure.

FIGS. 25 to 27 are views illustrating an operation of a touch sensor according to an example embodiment of the present disclosure.

First, referring to FIG. 25, a touch sensor according to an example embodiment of the present disclosure may use a first driving signal $V_{TX}$ and a second driving signal $V_{TXb}$, having phases opposite to each other. For example, the touch sensor may include a plurality of driving electrodes, and two or more of the plurality of driving electrodes may be driven simultaneously. The first driving signal $V_{TX}$ may be input to a portion of the driving electrodes that are simultaneously driven, and the second driving signal $V_{TXb}$ may be input to the others of the driving electrodes that are simultaneously driven.

As illustrated in FIG. 25, an effect of the first driving signal $V_{TX}$ and an effect of the second driving signal $V_{TXb}$ may be simultaneously reflected in a common display voltage $V_{DPVSS}$, and the effect of the first driving signal $V_{TX}$ and the effect of second driving signal $V_{TXb}$ may be offset. For example, when the source signal Data is input to the n+1$^{th}$ gate line, the effect of each of the first driving signal $V_{TX}$ and the second driving signal $V_{TXb}$ may be offset by the common display voltage $V_{DPVSS}$. Noise can be mitigated or removed. Therefore, since the common display voltage $V_{DPVSS}$ may change due to the operation of the touch sensor, the problem of introducing noise into the display may be effectively mitigated or eliminated.

Referring to FIGS. 26A to 26C, a touch sensor 800 may include a plurality of touch nodes 805, and each of the touch nodes 805 may include a driving electrode 801 and a sensing electrode 802. In example embodiments illustrated in FIGS. 26A to 26C, the sensing electrodes 802 may be arranged on both sides of the driving electrode 801 in each of the touch nodes 805, but are only an example embodiment. The arrangement of the sensing electrodes 802 may be variously modified. In the touch sensor 800 according to example embodiments illustrated in FIGS. 26A to 26C, the driving electrode 801 and the sensing electrode 802 may be arranged on the same layer.

Referring to FIG. 26B, which illustrates an n$^{th}$ scan period of the touch sensor 800, a first driving signal $V_{TX}$ may be input to odd-numbered touch nodes arranged along odd-numbered column lines 810 and 830, and a second driving signal $V_{TXb}$ having a phase opposite to that of the first driving signal $V_{TX}$ may be input to even-numbered touch nodes arranged along even-numbered column lines 820 and 840. Referring to FIG. 26C illustrating an n+1$^{th}$ scan period of the touch sensor 800, a first driving signal $V_{TX}$ may be input to odd-numbered touch nodes, and a second driving signal $V_{TXb}$ may be input to even-numbered touch nodes.

The above is only an example, and an operation method of the touch sensor 800 may be variously modified. For example, in an n+1$^{th}$ scan period, the second driving signal $V_{TXb}$ may be input to the odd-numbered touch nodes, and the first driving signal $V_{TX}$ may be input to even-numbered touch nodes. As various examples, an operation of the touch sensor 800 can be understood according to the example embodiments described above with reference to FIGS. 11 to 20.

Next, referring to FIG. 27, a touch sensor 900 according to an example embodiment of the present disclosure may include a plurality of driving electrodes 911-918, and a plurality of sensing electrodes 921-926. The driving electrodes 911-918 and the sensing electrodes 921-926 are illustrated as having a diamond pattern, but are not necessarily limited thereto. The driving electrodes 911-918 and the sensing electrodes 921-926 may be arranged on different layers. For example, the driving electrodes 911-918 may be arranged below the sensing electrodes 921-926 such that the drive electrodes 911-918 are arranged closer to the display, compared to the sensing electrodes 921-926.

The touch sensor 900 may include a first region 901 and a second region 902, and driving electrodes 911-914 included in the first region 901 may be separated from driving electrodes 915-918 in the second region 902. The touch sensor 900 may simultaneously drive one of the driving electrodes 911-914 in the first region 901 and one of the driving electrodes 915-918 in the second region 902 for one scan period.

For example, a first driving electrode 911 in the first region 901 and a first driving electrode 915 in the second region 902 may be driven simultaneously. A first driving signal $V_{TX}$ may be input to the first driving electrode 911 in the first region 901, and a second driving signal $V_{TXb}$ may be input to the first driving electrode 915 in the second region 902. The first driving signal $V_{TX}$ and the second driving signal $V_{TXb}$ having opposite phases may be simultaneously input to the touch sensor 900, and an effect of an operation of the touch sensor 900 on a display may be minimized.

In some example embodiments, the driving electrodes 911-918 simultaneously driven in the first region 901 and the second region 902 may be arranged in different positions in a vertical direction. For example, while the first driving signal $V_{TX}$ is input to the first driving electrode 911 in the first region 901, the second driving signal $V_{TXb}$ may be input to one of second to fourth driving electrodes 916 to 918 in the second region 902.

Figure 28:
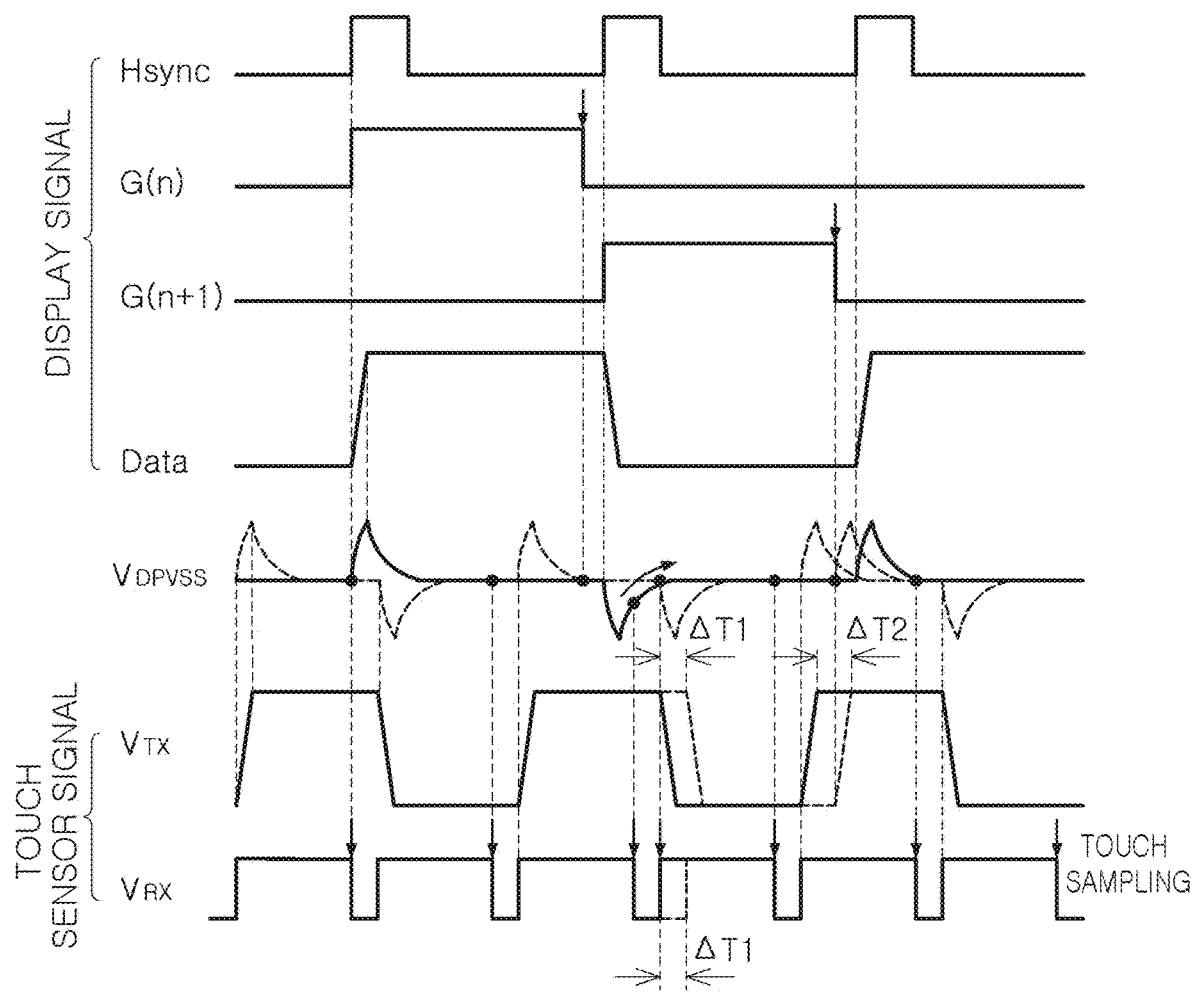

FIG. 28 is a view illustrating an operation of a touch sensor according to an example embodiment of the present disclosure. In an example embodiment illustrated in FIG. 28, an operation of the display may be as described above with reference to FIGS. 23 and 24.

Referring to FIG. 28, timing of a driving signal $V_{TX}$ input to a driving electrode of a touch sensor may be adjusted to reduce an effect of an operation of a display on the touch sensor. Referring to FIG. 28, in order to minimize an effect of a common display voltage $V_{DPVSS}$ decreasing during a falling period of a source signal Data, the falling period of the driving signal $V_{TX}$ may be delayed by a first time difference $\Delta T1$. As the falling period of the driving signal $V_{TX}$ is delayed by the first time difference $\Delta T1$, third touch sampling time may also be delayed by a time difference that is the same as or substantially similar to the first time difference ΔT1, and at the third touch sampling time, the common display voltage $V_{DPVSS}$ may have a state in which there is little noise. Therefore, the effect of the change of the common display voltage $V_{DPVSS}$ caused by the source signal Data on the touch sensor may be minimized.

In addition, when a rising period of the driving signal $V_{TX}$ overlaps an input point of the source signal Data in the display, noise may be reflected in the common display voltage $V_{DPVSS}$. In an example embodiment illustrated in FIG. 28, since a point in time at which the source signal Data is input to an n+1$^{th}$ gate line and the rising period of the driving signal $V_{TX}$ overlap each other, the common display voltage $V_{DPVSS}$ may be higher than a normal value.

In an example embodiment of the present disclosure, the effect of the operation of the touch sensor on the display may be minimized by adjusting the rising period of the driving signal $V_{TX}$. Referring to FIG. 28, rising time of the driving signal $V_{TX}$ may be delayed by a second time difference ΔT2, such that a point in time at which the source signal Data is input to the n+1$^{th}$ gate line and the rising period of the driving signal $V_{TX}$ do not overlap each other. Therefore, when the source signal Data is input to the n+1 th gate line, the common display voltage VDPVSS may have a state in which there is little noise. Also, in an example embodiment, when a point in time at which the source signal Data is input overlaps the falling period of the driving signal $V_{TX}$, the touch sensor may delay or advance the falling period of the driving signal $V_{TX}$. When adjusting the falling period of the driving signal $V_{TX}$, the touch sensor may adjust the touch sampling time for reading the sensing signal from the sensing electrode.

Figure 29:
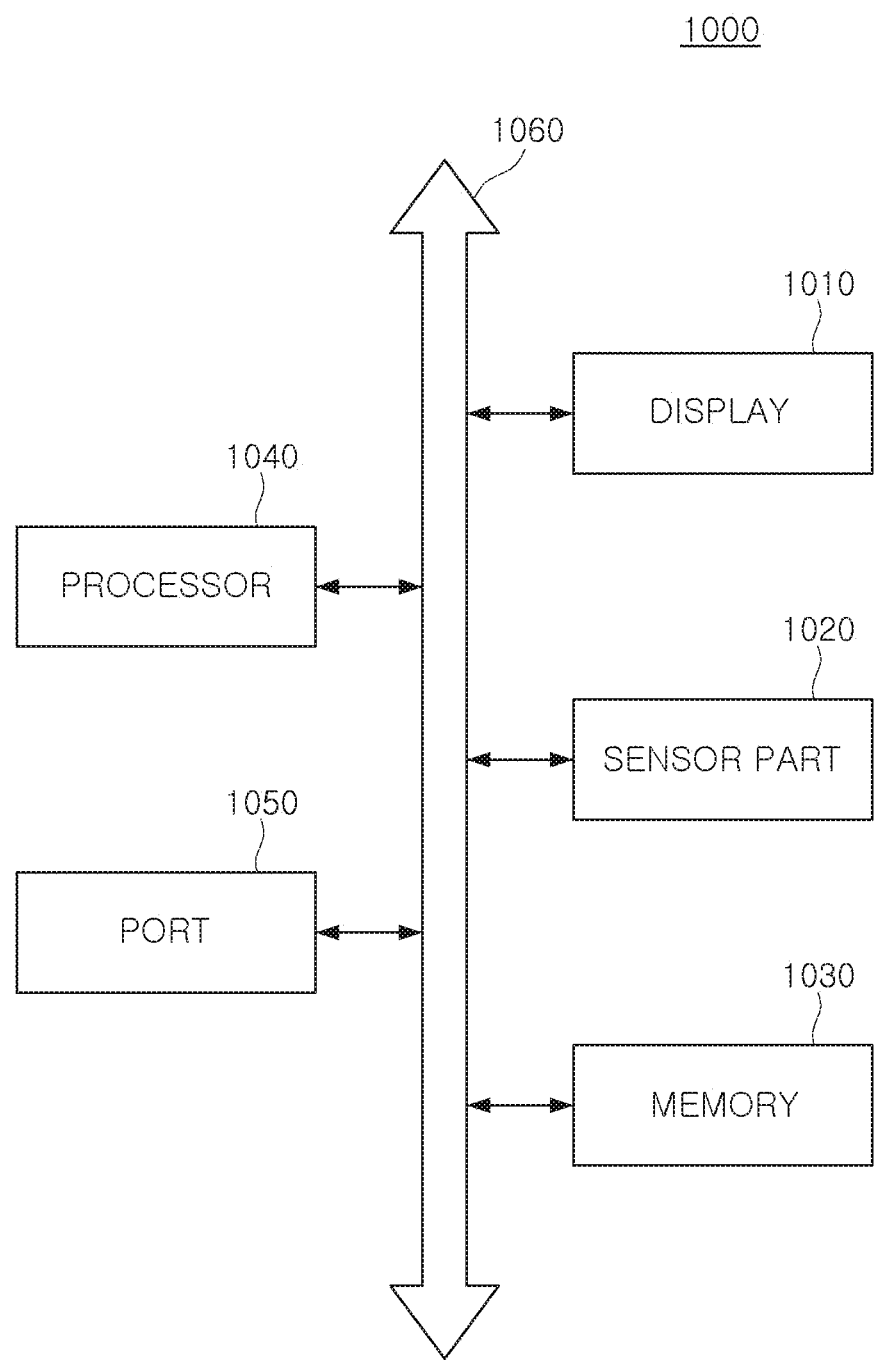
FIG. 29 is a block diagram schematically illustrating an electronic device including a touch sensor according to an example embodiment in the present disclosure.

FIG. 29 is a block diagram briefly illustrating an electronic device including a memory device according to an example embodiment in the present disclosure.

A computer device 1000 according to the example embodiment illustrated in FIG. 29 may include a display 1010, a sensor part 1020, a memory 1030, a processor 1040, a port 1050, and the like. In addition, the computer device 1000 may further include a wired/wireless communication device, a power supply device, and the like. Among the components illustrated in FIG. 21, the port 1050 may be a provided for the computer device 1000 to communicate with a video card, a sound card, a memory card, a USB device, and the like. The computer device 1000 may include, for example, a smartphone, a tablet PC, a smart wearable device, a general desktop computer, and a laptop computer.

The processor 1040 may perform specific operations, instructions, tasks, and the like. The processor 1040 may be a central processing unit (CPU) or microprocessor unit (MCU), a system on chip (SoC), and the like, and may communicate with other devices connected to the port 1050, as well as the display 1010, the sensor part 1020, the memory 1030, through a bus 1060.

The memory 1030 may be a storage medium storing data necessary for an operation of the computer device 1000, or multimedia data. The memory 1030 may include a volatile memory such as a random-access memory (RAM), or a non-volatile memory such as a flash memory. The memory 1030 may also include at least one of a solid-state drive (SSD), a hard disk drive (HDD), and an optical disk drive (ODD) as a storage device.

The display 1010 may be provided integrally with a touch sensor. Also, in the example embodiment illustrated in FIG. 29, the display 1010 may include the touch sensor according to various example embodiments described above with reference to FIGS. 1 through 28.

As set forth above, according to example embodiments in the present disclosure, in the touch sensor that detects a touch input using a change in mutual capacitance, because driving signals having opposite phases are input to the driving electrodes of touch nodes adjacent to each other, an influence due to a change in self-capacitance appearing due to an unstable grounding state may be reduced or minimized. Therefore, because the influence due to the unstable grounding state is reduced or minimized, performance of the touch sensor may be improved While example embodiments have been illustrated and described above, it will be apparent to those skilled in the art that modifications and variations could be made without departing from the scope of the present disclosure as defined by the appended claims.

What is claimed is:

1. A touch sensor comprising:
a sensor array including a first touch node and a second touch node adjacent to each other in a first direction, the first touch node and the second touch node electrically separated from each other, each of the first touch node and the second touch node including a driving electrode and a sensing electrode; and
a controller configured to output a first driving signal having a first phase to the driving electrode of the first touch node and output a second driving signal having a second phase opposite to the first phase of the first driving signal to the driving electrode of the second touch node during a first time period,
wherein the sensor array further includes a third touch node adjacent to the first touch node in a second direction and a fourth touch node adjacent to the second touch node in the second direction, the second direction perpendicular to the first direction, and
the controller is configured to output one of the first driving signal or the second driving signal to the third touch node and the other of the first driving signal or the second driving signal to the fourth touch node during a second time period subsequent to the first time period.

2. The touch sensor of claim 1, wherein
the sensing electrode of the first touch node and the sensing electrode of the third touch node are electrically connected to each other, and
the sensing electrode of the second touch node and the sensing electrode of the fourth touch node are electrically connected to each other.

3. The touch sensor of claim 1, wherein
the driving electrode of the first touch node and the driving electrode of the third touch node are electrically connected to each other, and
the driving electrode of the second touch node and the driving electrode of the fourth touch node are electrically connected to each other.

4. The touch sensor of claim 3, wherein
the controller is configured to output the second driving signal to the second touch node and the fourth touch node, while outputting the first driving signal to the first touch node and the third touch node.

5. The touch sensor of claim 1, wherein
the driving electrode of the first touch node and the driving electrode of the fourth touch node are electrically connected to each other, and
the driving electrode of the second touch node and the driving electrode of the third touch node are electrically connected to each other.

6. The touch sensor of claim 5, wherein
the controller is configured to output the second driving signal to the second touch node and the third touch node, while outputting the first driving signal to the first touch node and the fourth touch node.

7. A sensor array comprising:
a first touch node including a first driving electrode and a first sensing electrode in at least one of a first direction or a second direction, the second direction being perpendicular to the first direction, the first driving electrode configured to receive a first driving signal having a first phase during a first time period, the first sensing electrode being adjacent to the first driving electrode; and
a second touch node being adjacent to the first touch node in at least one of the first direction or the second direction, the second touch node including a second driving electrode and a second sensing electrode, the second driving electrode configured to receive a second driving signal having a second phase opposite to the first phase of the first driving signal during the first time period, the second sensing electrode electrically separated from the first sensing electrode,
wherein the first touch node and the second touch node are arranged in the first direction,
the sensor array further includes a third touch node and a fourth node, the third touch node being between the first touch node and the second touch node in the first direction and the fourth touch node being adjacent to the second touch node in the first direction such that the second touch node is between the third touch node and the fourth touch node in the first direction,
the third touch node includes a third driving electrode and a third sensing electrode, and the fourth touch node includes a fourth driving electrode and a fourth sensing electrode, and
the third driving electrode is configured to receive a third driving signal having a third phase and the fourth driving electrode is configured to receive a fourth driving signal having a fourth phase opposite to the third phase.

8. The touch sensor of claim 7, wherein
the controller is configured to simultaneously output the first driving signal, the second driving signal, the third driving signal, and the fourth driving signal.

9. The touch sensor of claim 7, wherein
the driving electrode of the first touch node and the driving electrode of the third touch node are electrically separated from each other, and
the driving electrode of the second touch node and the driving electrode of the fourth touch node are electrically separated from each other.

10. The sensor array of claim 7, wherein
at least one of the first sensing electrode or the second sensing electrode is between the first driving electrode and the second driving electrode in at least one of the first direction or the second direction.

11. The sensor array of claim 7, wherein
the first sensing electrode includes a plurality of sub-electrodes, and
the first driving electrode is between the plurality of sub-electrodes in at least one of the first direction or the second direction.

12. The sensor array of claim 7, wherein
a first length of the first driving electrode is shorter than a second length of the first sensing electrode in at least one of the first direction or the second direction.

13. The sensor array of claim 7, wherein
a first arrangement of the first driving electrode and the first sensing electrode in the first touch node is same as a second arrangement of the second driving electrode and the second sensing electrode in the second touch node.

14. The sensor array of claim 7, wherein
a first arrangement of the first driving electrode and the first sensing electrode in the first touch node is different from a second arrangement of the second driving electrode and the second sensing electrode in the second touch node.

15. A sensor array comprising:
a plurality of first driving lines each including a plurality of first driving electrodes physically separate from each other while electrically connected to each other, the plurality of first driving electrodes included in a first touch node, a second touch node, a third touch node and a fourth touch node, the second touch node adjacent to the first touch node in a first direction, the third touch node adjacent to the first touch node in a second direction and the fourth touch node adjacent to the second touch node in the second direction, the second direction perpendicular to the first direction;
a plurality of first sensing lines each including a plurality of first sensing electrodes, the plurality of first sensing electrodes physically separate from each other while adjacent to at least one of the plurality of first driving electrodes;
a plurality of second driving lines electrically separated from the plurality of first driving lines, each of the plurality of second driving lines including a plurality of second driving electrodes physically separate from each other while electrically connected to each other;
a plurality of second sensing lines each including a plurality of second sensing electrodes, the plurality of second sensing electrodes physically separate from each other while adjacent to at least one of the plurality of second driving electrodes; and
a controller configured to,
output a first driving signal having a first phase to a driving electrode of the first touch node, from among the plurality of first driving electrodes, and output a second driving signal having a second phase opposite to the first phase of the first driving signal to the driving electrode of the second touch node, from among the plurality of first driving electrodes, during a first time period, and
output one of the first driving signal or the second driving signal to a driving electrode of the third touch node, from among the plurality of first driving electrodes, and the other of the first driving signal or the second driving signal to a driving electrode of the fourth touch node, from among the plurality of first driving electrodes, during a second time period subsequent to the first time period,
wherein first waveforms of first sensing signals of the plurality of first sensing electrodes are different from second waveforms of second sensing signals of the plurality of second sensing electrodes.

16. The sensor array of claim 15, wherein
the plurality of first driving lines, the plurality of second driving lines, the plurality of first sensing lines, and the plurality of second sensing lines have a mesh shape including opening regions.

* * * * *